United States Patent
Seki et al.

(10) Patent No.: US 8,262,771 B2
(45) Date of Patent: Sep. 11, 2012

(54) FLAMMABLE GAS CONCENTRATION DEVICE AND FLAMMABLE GAS CONCENTRATION METHOD

(75) Inventors: Kenji Seki, Higashiosaka (JP); Etsuo Shito, Matsubara (JP); Katsuhiko Hirao, Nara (JP)

(73) Assignee: Osaka Gas Co., Ltd., Osaka (JP)

( * ) Notice: Subject to any disclaimer, the term of this patent is extended or adjusted under 35 U.S.C. 154(b) by 543 days.

(21) Appl. No.: 12/446,806

(22) PCT Filed: Oct. 11, 2007

(86) PCT No.: PCT/JP2007/069865
§ 371 (c)(1),
(2), (4) Date: Sep. 22, 2009

(87) PCT Pub. No.: WO2008/053680
PCT Pub. Date: May 8, 2008

(65) Prior Publication Data
US 2010/0005958 A1    Jan. 14, 2010

(30) Foreign Application Priority Data

Oct. 31, 2006  (JP) ............................... 2006-296619
Jun. 21, 2007  (JP) ............................... 2007-164017

(51) Int. Cl.
*B01D 53/04* (2006.01)
(52) U.S. Cl. .................. 95/95; 95/105; 95/143; 96/111; 96/115; 96/121; 96/130
(58) Field of Classification Search .................... 96/108, 96/109, 111, 115, 121, 130; 95/95–98, 104, 95/105, 143, 148
See application file for complete search history.

(56) References Cited

U.S. PATENT DOCUMENTS

| | | | |
|---|---|---|---|
| 3,564,816 A * | 2/1971 | Batta ............................. | 95/100 |
| 4,305,734 A | 12/1981 | McGill | |
| 4,326,858 A * | 4/1982 | Benkmann ...................... | 95/98 |
| 4,498,910 A * | 2/1985 | Benkmann ...................... | 95/100 |
| 4,521,221 A | 6/1985 | Richter et al. | |
| 4,995,890 A * | 2/1991 | Croudace ....................... | 96/111 |
| 5,415,682 A * | 5/1995 | Zarchy et al. .................. | 95/101 |
| 6,514,317 B2 * | 2/2003 | Hirano et al. .................. | 95/96 |

FOREIGN PATENT DOCUMENTS

JP  58198591  11/1983
JP  59157036  9/1984

* cited by examiner

*Primary Examiner* — Frank Lawrence, Jr.
(74) *Attorney, Agent, or Firm* — The Webb Law Firm

(57) ABSTRACT

A flammable gas concentration device comprises an adsorption tower filled by an adsorbent for adsorbing a flammable gas. Raw gas containing air and a flammable gas is fed to the adsorption tower via a feeding path and an exhaust gas in the raw gas which has not been adsorbed to the adsorbent is discharged to an outside of the adsorption tower via a discharge path. Pressure in the adsorption tower is reduced lower than an atmospheric pressure, and the flammable gas adsorbed by the adsorbent is desorbed and collected through a collection path. A flammable gas adsorption step of feeding the raw gas to the adsorption tower and discharging the exhaust gas from the adsorption tower, and a flammable gas desorption step of collecting the desorbed flammable gas are sequentially executed.

17 Claims, 13 Drawing Sheets

Fig.6

| PRESSURE IN ADSORPTION TOWER 2 | METHANE CONCENTRATION IN METHANE GAS PG |
|---|---|
| −10KPa ~ −18KPa | 20.5% |
| −20KPa ~ −30KPa | 25.3% |
| −30KPa ~ −40KPa | 26.1% |
| −40KPa ~ −50KPa | 29.8% |
| −50KPa ~ −60KPa | 31.8% |
| −60KPa ~ −70KPa | 39.5% |
| −70KPa ~ −80KPa | 48.9% |
| −80KPa ~ −87KPa | 59.4% |
| −87KPa ~ −94KPa | 72.9% |
| −94KPa ~ −97KPa | 82.5% |

FLAMMABLE GAS CONCENTRATION DEVICE AND FLAMMABLE GAS CONCENTRATION METHOD

TECHNICAL FIELD

The present invention relates to a flammable gas concentration device and flammable gas concentration method for feeding a raw gas containing a flammable gas and air to an adsorption tower, and adsorbing and concentrating the flammable gas.

BACKGROUND ART

In order to effectively utilize a flammable gas as a fuel or the like, it is necessary to separate air and other gases from a raw gas that includes the flammable gas, and concentrate the flammable gas to an appropriate range. Various devices and methods have been proposed for concentrating such a flammable gas, and in Patent Document 1, for example, a technique is disclosed in which a gas (so-called coal mine gas) occurring in a coal mine that contains methane gas as a flammable gas is used as the raw gas, air (primarily including nitrogen, oxygen, and carbon dioxide) is separated from the raw gas using an adsorbent, and the methane gas is concentrated and utilized.

Specifically, Patent Document 1 proposes a device and method whereby natural zeolite, which is extremely slow to adsorb methane gas compared to nitrogen, is used as the adsorbent (in other words, an adsorbent that adsorbs nitrogen, oxygen, and carbon dioxide with priority with respect to methane gas is used), coal mine gas is introduced to a predetermined pressure through the use of a compressor or the like into an adsorption tower filled with an adsorbent, the oxygen, nitrogen, and carbon dioxide included in the coal mine gas are adsorbed first in the forward part (lower part) of the adsorption tower, the methane gas having a slow adsorption rate is adsorbed in the inner part (upper part) of the adsorption tower, the methane gas is released from the upper part of the adsorption tower until atmospheric pressure is attained, and the methane gas is concentrated.

Air is thereby separated from the coal mine gas as the raw gas using the adsorbent, the methane gas is concentrated, and the concentrated methane gas can be utilized as a fuel or the like.

[Patent Document 1] Japanese Laid-open Patent Application No. 58-198591

DISCLOSURE OF THE INVENTION

A flammable gas generally has the potential for explosion, and explosion is considered possible when a flammable gas is included in the raw gas or the like in a predetermined concentration range. This concentration range varies according to the type of flammable gas, but the flammable gas is generally included in a range of about 5 to 20 vol %. Explosion is considered possible in a concentration range in the same manner in the case of methane gas described above.

The potential for explosion of the flammable gas is considered to be present as well when a predetermined concentration of oxygen gas is present in the raw gas or the like in addition to the predetermined concentration of the flammable gas. This concentration range is a range of 10 vol % or higher of included oxygen gas.

Consequently, adequate attention must be given to the concentration range of oxygen gas and the flammable gas when a gas containing a flammable gas is handled. Particularly when the gas includes a flammable gas or oxygen gas near a concentration range in which explosion is possible, it is important that the concentration of the flammable gas or the oxygen gas be adjusted so as not to be within the abovementioned concentration range.

In the invention disclosed in Patent Document 1, although the post-concentration methane gas is at a relatively high concentration (a methane concentration of about 60 vol %) and outside the explosive concentration range, methane gas is included at a relatively low concentration (a methane concentration of 44 vol % or lower) in the exhaust gas after the methane gas has been extracted to a certain extent from the coal mine gas (having a methane concentration of about 44 vol %, and an oxygen gas concentration of about 12 vol %), and oxygen gas is also included at a predetermined concentration (an oxygen gas concentration of about 12 vol % or higher). There is therefore a possibility of either the methane gas or the oxygen gas being within the explosive concentration range, and problems occur in that there is a risk of explosion of the exhaust gas.

The methane gas concentration is extremely high (a methane gas concentration of about 99 vol %) when the coal mine gas is in the coal mine, but because air is mixed in when the coal mine gas naturally flows out, or when a vacuum pump or the like is used to draw out the coal mine gas for use, a state occurs in which the methane concentration is low (depending on conditions, a state in which methane gas is included at an average of about 20 to 40 vol %, for example).

Consequently, when coal mine gas at a concentration near the concentration range at which explosion is possible is introduced into an adsorption tower using a compressor or the like as in the invention disclosed in Patent Document 1, the pressure of the coal mine gas increases, and problems occur in that there is a risk of explosion in concentration ranges that are wider than the abovementioned concentration range.

Specifically, the concentrating the methane gas through the use of a compressor inside the coal mine is not necessarily preferred.

The possibility of explosion of the methane gas concentration device in Patent Document 1 occurs not only in the methane gas concentration device, but can also occur in a concentration device for a flammable gas in general.

The present invention was developed in view of the problems described above, and an object of the present invention is to provide a technique capable of performing concentration to a high concentration while preventing the concentration from being in the explosive range when a flammable gas is concentrated.

A first aspect of the flammable gas concentration device according to the present invention for achieving the abovementioned objects comprises an adsorption tower filled by an adsorbent for adsorbing a flammable gas; feeding means for feeding a raw gas containing air and a flammable gas to the adsorption tower via a feeding path and discharging an exhaust gas in the raw gas which has not been adsorbed to the adsorbent to an outside of the adsorption tower via a discharge path; collection means for reducing a pressure in the adsorption tower lower than an atmospheric pressure, and desorbing the flammable gas adsorbed by the adsorbent and collecting the flammable gas through a collection path; and control means for sequentially executing a flammable gas adsorption step of feeding the raw gas to the adsorption tower and discharging the exhaust gas from the adsorption tower by the feeding means, and a flammable gas desorption step of collecting the flammable gas desorbed by the collection means.

According to the first aspect described above, a flammable gas adsorption step of adsorbing the flammable gas from the raw gas fed to the adsorption tower to the adsorbent and discharging the exhaust gas not adsorbed to the adsorbent in the raw gas from the adsorption tower to the outside by the feeding means, and a flammable gas desorption step of reducing the pressure inside the adsorption tower lower than atmospheric pressure through the use of the collection means, and desorbing and collecting the flammable gas adsorbed by the adsorbent are executed in sequence through the control of the control means.

In the flammable gas adsorption step, the flammable gas as such can thereby be adsorbed to the adsorbent, and the concentration of the flammable gas in the exhaust gas can be placed in an extremely low concentration range that is outside the explosive range.

Since the pressure of the adsorption tower is reduced lower than atmospheric pressure, and the flammable gas is desorbed in the flammable gas desorption step, the concentration of the flammable gas can be made higher than the explosive range, the oxygen concentration can be reduced at the same time, and the concentration of the collected and concentrated flammable gas can be placed outside the explosive range while the recovery rate of the flammable gas is increased.

Furthermore, since the feeding means simultaneously feeds the raw gas into the adsorption tower and discharges the exhaust gas from the adsorption tower, and an adsorbent is used that has high adsorption performance of the flammable gas near atmospheric pressure, the raw gas can be fed to the adsorption tower merely by blowing or the like without the use of a compression pump or the like, and the pressure of the raw gas can be prevented from increasing to a concentration within the explosive range which may otherwise be caused by a compressor or the like during feeding of the raw gas.

A second aspect of the flammable gas concentration device according to the present invention is the flammable gas concentration device according to the first aspect, wherein the adsorbent is a methane adsorbent for adsorbing methane gas as the flammable gas, and is at least one adsorbent selected from a group that includes active carbon, zeolite, silica gel, and an organic metal complex having an average micropore diameter of 4.5 to 15 Å as measured by the MP method, and a methane gas adsorption of 20 Ncc/g or higher at atmospheric pressure and 298 K.

According to the second aspect described above, a methane adsorbent capable of selectively adsorbing methane gas at atmospheric pressure and 298 K is used as the adsorbent, and it is thereby possible to adequately adsorb methane gas to the methane adsorbent even at atmospheric pressure and 298 K.

Specifically, when the methane adsorption at atmospheric pressure and 298 K is less than 20 Ncc/g, the methane adsorption performance at low pressure (particularly at about atmospheric pressure) is reduced, the methane concentration of the post-concentration methane gas is reduced, and the quantity of the adsorbent must be increased and the size of the device increased in order to maintain the adsorption performance. The upper limit of the abovementioned methane adsorption is not particularly limited, but the methane adsorption currently obtained in the methane adsorbent is about 40 Ncc/g or lower.

When the average micropore diameter as measured by the MP method (Molecular Probe method) is smaller than 4.5 Å, the adsorption of oxygen gas and nitrogen gas increases, the methane concentration in the post-concentration methane gas is reduced, the average micropore diameter approaches the methane molecular diameter, the adsorption rate decreases, the methane adsorption performance is reduced, and adsorption becomes impossible. On the other hand, when the average micropore diameter as measured by the MP method is greater than 15 Å, the methane adsorption performance at low pressure (particularly at about atmospheric pressure) is reduced, the methane concentration of the post-concentration methane gas is reduced, and the quantity of the adsorbent must be increased and the size of the device increased in order to maintain the adsorption performance.

Consequently, the adsorbent is preferably at least one adsorbent selected from the group that includes active carbon, zeolite, silica gel, and an organic metal complex having an average micropore diameter of 4.5 to 15 Å as measured by the MP method, and a methane gas adsorption of 20 Ncc/g or higher at atmospheric pressure and 298 K.

A third aspect of the flammable gas concentration device according to the present invention is the flammable gas concentration device according to the first or second aspect, wherein the adsorbent is a methane adsorbent for adsorbing methane gas as the flammable gas, in which a volume of micropores having an average micropore diameter of 10 Å or less as measured by the HK method is 50 vol % or more of a total micropore volume.

According to the third aspect described above, since the volume of micropores having an average micropore diameter of 10 Å or less as measured by the HK method (Horvath-Kawazoe method) is 50 vol % or more of the total micropore volume, the amount of methane gas that can be adsorbed even at atmospheric pressure is increased, and methane gas can be adequately adsorbed. There is no particular lower limit for the abovementioned average micropore diameter, and it is sufficient insofar as the volume of micropores having an average micropore diameter of 10 Å or less is 50% or more of the total micropore volume.

A fourth aspect of the flammable gas concentration device according to the present invention is the flammable gas concentration device according to the first or second aspect, wherein the adsorbent is a methane adsorbent for adsorbing methane gas as the flammable gas, and the nitrogen adsorption at 77 K is such that the nitrogen adsorption at a relative pressure of 0.013 corresponding to an average micropore diameter of 10 Å as measured by the HK method is 50 vol % or more of a nitrogen adsorption at a relative pressure of 0.99 corresponding to the total micropore volume. The term "relative pressure" refers to the pressure ratio with respect to the saturation vapor pressure at the measurement temperature.

According to the fourth aspect, the nitrogen adsorption in a low-pressure state, which is a relative pressure of 0.013, corresponding to an average micropore diameter of 10 Å as measured by the HK method (Horvath-Kawazoe method) as the nitrogen adsorption at 77 K is set to 50 vol % or higher of the nitrogen adsorption in a state near the saturation vapor pressure at 77 K, which is a relative pressure of 0.99, corresponding to the total micropore volume.

The adsorption at a relative pressure of 0.99 represents the total micropore volume, and the adsorption at a relative pressure of 0.013 represents the volume of micropores having an average micropore diameter of 10 Å or less, and the ratio of these values indicates that the ratio of micropores having an average micropore diameter of 10 Å or less is higher, in the same manner as described above. As a result, methane gas near atmospheric pressure can be easily and efficiently concentrated even when a mixed gas of methane gas and air is used as the raw gas.

A fifth aspect of the flammable gas concentration device according to the present invention is the flammable gas concentration device according to any of the first through fourth aspects, comprising adsorption completion detection means for detecting a state of the flammable gas in the discharge path; wherein the control means executes a switch from the flammable gas adsorption step to the flammable gas desorption step on the basis of detection results of the adsorption completion detection means.

According to the fifth aspect described above, the control means can perform a switch from the flammable gas adsorption step to the flammable gas desorption step on the basis of the detection result of the adsorption completion detection means.

The state of the flammable gas in the discharge path is thereby detected, and when a determination can be made that adsorption of the flammable gas is completed, it is possible to execute the flammable gas desorption step immediately after the flammable gas adsorption step, and to prevent flammable gas that was not adsorbed from being discharged to the discharge path in conjunction with the completion of adsorption.

A sixth aspect of the flammable gas concentration device according to the present invention is the flammable gas concentration device according to any of the first through fifth aspects, wherein the control means executes the flammable gas adsorption step after feeding air to the adsorption tower in which the flammable gas desorption step has been completed.

According to the sixth aspect described above, the control means executes the flammable gas adsorption step after feeding air to the adsorption tower in which the flammable gas desorption step has been completed.

Air at a relatively high pressure (near atmospheric pressure) is fed into the adsorption tower that is in a state in which the flammable gas desorption step is completed and the pressure is reduced lower than atmospheric pressure, and the pressure can be increased to a pressure near atmospheric pressure (sometimes referred to hereinafter as the air pressure-increase step), and an environment can be created in which the flammable gas as the adsorption target is easily adsorbed when the flammable gas adsorption step is executed in the adsorption tower.

A seventh aspect of the flammable gas concentration device according to the present invention is the flammable gas concentration device according to the sixth aspect, wherein the control means furthermore feeds the collected flammable gas to the adsorption tower after feeding air to the adsorption tower, and then executes the flammable gas adsorption step.

According to the seventh aspect described above, the control means can furthermore feed the highly concentrated flammable gas collected in the flammable gas desorption step to the adsorption tower in which the flammable gas desorption step is completed, after feeding air to the adsorption tower, and then execute the flammable gas adsorption step.

Specifically, air at a relatively high pressure (near atmospheric pressure) is fed into the adsorption tower that is in a state in which the flammable gas desorption step is completed and the pressure is reduced lower than atmospheric pressure, and the pressure can be increased to a predetermined pressure, and then the highly concentrated flammable gas can be fed and the pressure increased from the predetermined pressure to a pressure near atmospheric pressure.

The raw gas and the flammable gas at a higher concentration than the raw gas can thereby be fed to the adsorbent when the flammable gas adsorption step is executed in the adsorption tower, and the rate of concentrating the flammable gas can be enhanced in comparison to a case in which only the raw gas is fed. By increasing the pressure inside the adsorption tower to a pressure near atmospheric pressure, an environment can be created in which the flammable gas that is the adsorption target is easily adsorbed. It is also possible to perform no pressure increase by air in order to enhance the concentration rate, but when only highly concentrated flammable gas is fed to the adsorption tower, only the highly concentrated flammable gas is adsorbed in the flammable gas adsorption step, the flammable gas immediately reaches a predetermined concentration and is discharged from the discharge path, and the raw gas cannot be adequately adsorbed. It is therefore necessary to introduce air to increase the pressure to a predetermined value.

An eighth aspect of the flammable gas concentration device according to the present invention is the flammable gas concentration device according to any of the first through seventh aspects, comprising a purge path for communicating the adsorption tower and a storage tank for storing the collected flammable gas; wherein the control means executes a purge step of circulating a portion of the highly concentrated flammable gas in the storage tank through the purge path into the adsorption tower in which the flammable gas adsorption step has been completed, prior to the flammable gas desorption step.

According to the eighth aspect described above, the control means executes a purge step of circulating a portion of the highly concentrated flammable gas stored in the storage tank through the purge path for communicating the storage tank and the adsorption tower into the adsorption tower in which the flammable gas adsorption step has been completed, prior to the flammable gas desorption step.

With this structure, after the completion of the flammable gas adsorption step and before the initiation of the flammable gas desorption step, the exhaust gas (considered to include mostly nitrogen gas and oxygen gas) inside the adsorption tower in which almost no flammable gas is present is thereby driven out of the adsorption tower and discharged to the discharge path by the highly concentrated flammable gas stored in the storage tank through the execution of the purge step. Since the concentration of the flammable gas in the adsorption tower is increased, and purging is performed with a highly concentrated flammable gas, the flammable gas adsorption is increased, to thereby prevent reduction of the concentration of the flammable gas collected in the subsequently executed flammable gas desorption step.

A ninth aspect of the flammable gas concentration device according to the present invention is the flammable gas concentration device according to the eighth aspect, wherein the control means executes a recirculation step of recirculating the highly concentrated flammable gas to the feeding path through a purge gas recovery path for communicating and connecting the discharge path and the feeding path, prior to the flammable gas desorption step and after the highly concentrated flammable gas circulated to the adsorption tower is discharged to the discharge path from the adsorption tower in the purge step.

According to the ninth aspect described above, the control means can execute a recirculation step of recirculating the flammable gas to the feeding path through a purge gas recovery path for communicating and connecting the discharge path and the feeding path, prior to the flammable gas desorption step and after the gas inside the adsorption tower is driven out by the highly concentrated flammable gas circulated to the adsorption tower in the purge step, and the flammable gas is discharged to the discharge path from the adsorption tower.

The highly concentrated flammable gas used to discharge the gas inside the adsorption tower in the purge step can thereby be circulated again to the feeding path without being discharged to the space outside of the adsorption tower through the discharge path, the flammable gas concentrated to a high concentration can be prevented from being wasted, and the flammable gas that has been concentrated to a higher concentration than the raw gas can be furthermore used in concentration to further accelerate concentration of the flammable gas.

A tenth aspect of the flammable gas concentration device according to the present invention is the flammable gas concentration device according to any of the first through seventh aspects, wherein the adsorption tower is composed of two towers, and the control means executes the flammable gas adsorption step and the flammable gas desorption step in alternating fashion between the two adsorption towers.

According to the tenth aspect described above, the control means causes the flammable gas adsorption step and the flammable gas desorption step to be executed in alternating fashion between the two towers of the adsorption tower, the concentrated flammable gas can be continuously collected, and the ability to produce the flammable gas is enhanced.

An eleventh aspect of the flammable gas concentration device according to the present invention is the flammable gas concentration device according to the eighth or ninth aspect, wherein the adsorption tower is composed of a plurality of towers, and the control means sequentially executes the flammable gas adsorption step, the purge step, and the flammable gas desorption step among the plurality of adsorption towers.

According to the eleventh aspect, the control means causes the flammable gas adsorption step, the purge step, and the flammable gas desorption step to be sequentially executed among the adsorption towers composed of a plurality of towers, the concentrated flammable gas can be continuously collected, and highly concentrated flammable gas can be produced by the purge step. The ability to produce more highly concentrated flammable gas is therefore enhanced.

A twelfth aspect of the flammable gas concentration device according to the present invention is the flammable gas concentration device according to the tenth or eleventh aspect, wherein the control means executes a pressure equalization step between one adsorption tower in which the flammable gas desorption step is completed and the other adsorption tower in which the flammable gas adsorption step is completed, in which a gas in the other adsorption tower is flowed to the one adsorption tower through an adsorption tower communicating path for communicating therebetween, prior to the flammable gas adsorption step in the one adsorption tower and prior to the flammable gas desorption step in the other adsorption tower.

According to the twelfth aspect described above, the control means can be caused to execute a pressure equalization step of flowing gas in the one adsorption tower from the other adsorption tower through an adsorption tower communicating path for communicating the one adsorption tower and the other adsorption tower, prior to the flammable gas adsorption step in the one adsorption tower and prior to the flammable gas desorption step in the other adsorption tower.

The gas in the other adsorption tower is thereby flowed through the adsorption tower communicating path, from the other adsorption tower, which is in a state of relatively high pressure (near atmospheric pressure) prior to the flammable gas desorption step and after completion of the flammable gas adsorption step, to the one adsorption tower, which is in a state of relatively low pressure (from about atmospheric pressure to a vacuum state) prior to the flammable gas adsorption step and after completion of the flammable gas desorption step; the pressure inside both adsorption towers can be balanced by the pressure equalization step; and an environment can be created in which the flammable gas that is the adsorption target is easily adsorbed when the pressure inside the one adsorption tower is increased, and the flammable gas adsorption step is executed in the one adsorption tower.

When highly concentrated flammable gas is obtained by the flammable gas desorption step, the concentration of the obtained product gas increases as the pressure inside the adsorption tower decreases. Consequently, the pressure inside the adsorption tower prior to the flammable gas desorption step can be further reduced by executing the pressure equalization step, and a higher concentration of the flammable gas is obtained in comparison to a case in which the pressure equalization step is not executed.

A thirteenth aspect of the flammable gas concentration device according to the present invention is the flammable gas concentration device according to any of the first through twelfth aspects, comprising a re-feeding path for communicating the feeding path and a storage tank for storing collected flammable gas; wherein the control means in the flammable gas adsorption step mixes and feeds to the adsorption tower the raw gas flowing through the feeding path and a portion of the highly concentrated flammable gas flowing through the feeding path from the storage tank through the re-feeding path.

According to the thirteenth aspect described above, even in such cases as when the concentration of the flammable gas in the raw gas is low, the raw gas can be mixed with the highly concentrated flammable gas circulated through the re-feeding path from the storage tank in the feeding path prior to being fed to the adsorption tower, and can be fed into the adsorption tower after the concentration of the raw gas is increased to a certain degree.

The concentration of the post-concentration flammable gas that is collected in the storage tank can thereby be concentrated to an even higher concentration, and the concentration of the raw gas and the post-concentration flammable gas can be effectively prevented from entering the explosive range.

A first aspect of the flammable gas concentration method according to the present invention for achieving the above-mentioned objects comprises executing a flammable gas adsorption step of feeding a raw gas containing air and a flammable gas through a feeding path to an adsorption tower filled by an adsorbent for adsorbing the flammable gas, and discharging an exhaust gas in the raw gas which has not been adsorbed by the adsorbent to an outside of the adsorption tower via a discharge path; and subsequently executing a flammable gas desorption step of reducing a pressure in the adsorption tower lower than an atmospheric pressure, desorbing the flammable gas adsorbed by the adsorbent, and collecting the flammable gas through a collection path.

According to the first aspect described above, a flammable gas desorption step of reducing the pressure inside the adsorption tower below atmospheric pressure, and desorbing and collecting the flammable gas adsorbed to the adsorbent can be executed in sequence after executing a flammable gas adsorption step of adsorbing a flammable gas from a raw gas fed to the adsorption tower to an adsorbent, and discharging an exhaust gas in the raw gas which has not been adsorbed to the adsorbent to the outside of the adsorption tower.

The flammable gas as such can thereby be adsorbed to the adsorbent, and the concentration of the flammable gas in the exhaust gas can be placed in an extremely low concentration range and to a concentration that is outside the explosive range.

Since the pressure of the adsorption tower is reduced lower than atmospheric pressure, and the flammable gas is desorbed, the concentration of the flammable gas can be made higher than the explosive range, the oxygen concentration can be reduced at the same time, and the concentration of the collected and concentrated flammable gas can be placed outside the explosive range while the recovery rate of the flammable gas is increased.

Furthermore, since the raw gas is fed into the adsorption tower at the same time that the exhaust gas is discharged from the adsorption tower, and an adsorbent is used that has high adsorption performance of the flammable gas near atmospheric pressure, the raw gas can be fed to the adsorption tower merely by blowing or the like without the use of a compression pump or the like, and the pressure of the raw gas can be prevented from increasing to a concentration within the explosive range which may otherwise be caused by a compressor or the like during feeding of the raw gas.

A second aspect of the flammable gas concentration method according to the present invention is the flammable gas concentration method according to the first aspect, comprising executing a purge step of circulating a portion of highly concentrated flammable gas that is in a storage tank for storing the collected flammable gas through a purge path into the adsorption tower in which the flammable gas adsorption step has been completed, prior to executing the flammable gas desorption step.

According to the second aspect described above, it is possible to execute a purge step of circulating a portion of highly concentrated flammable gas stored in the storage tank through a purge path for communicating the storage tank and the adsorption tower into the adsorption tower in which the flammable gas adsorption step has been completed, prior to executing the flammable gas desorption step.

With this structure, after the completion of the flammable gas adsorption step and before the initiation of the flammable gas desorption step, the exhaust gas (considered to include mostly nitrogen gas and oxygen gas) inside the adsorption tower in which almost no flammable gas is present is thereby driven out of the adsorption tower and discharged to the discharge path by the highly concentrated flammable gas stored in the storage tank through the execution of the purge step. Since the concentration of the flammable gas in the adsorption tower is increased, and purging is performed with a highly concentrated flammable gas, the flammable gas adsorption is increased, to thereby prevent reduction of the concentration of the flammable gas collected in the subsequently executed flammable gas desorption step.

A third aspect of the flammable gas concentration method according to the present invention is the flammable gas concentration method according to the second aspect, comprising executing a recirculation step of recirculating the flammable gas to the feeding path through a purge gas recovery path prior to executing the flammable gas desorption step and after the flammable gas circulated to the adsorption tower is discharged to the discharge path from the adsorption tower in the purge step.

According to the third aspect described above, it is possible to execute a recirculation step of recirculating the flammable gas to the feeding path through a purge gas recovery path for communicating and connecting the discharge path and the feeding path, prior to executing the flammable gas desorption step and after the gas inside the adsorption tower is driven out by the highly concentrated flammable gas circulated to the adsorption tower in the purge step, and the flammable gas is discharged to the discharge path from the adsorption tower.

The highly concentrated flammable gas used to discharge the gas inside the adsorption tower in the purge step can thereby be circulated again to the feeding path without being discharged to the space outside of the adsorption tower through the discharge path, the flammable gas concentrated to a high concentration can be prevented from being wasted, and the flammable gas that has been concentrated to a higher concentration than the raw gas can be furthermore used in concentration to further accelerate concentration of the flammable gas.

BRIEF DESCRIPTION OF THE DRAWINGS

FIG. 6 is a graph showing the change in the methane concentration in the post-concentration methane gas PG as relates to the pressure inside the adsorption tower 2 in the methane gas desorption step;

BEST MODE FOR CARRYING OUT THE INVENTION

Embodiments of the flammable gas concentration device 100 (hereinafter abbreviated as "the present device 100") according to the present invention will be described based on the drawings.

[Embodiment 1]

Figure 1:
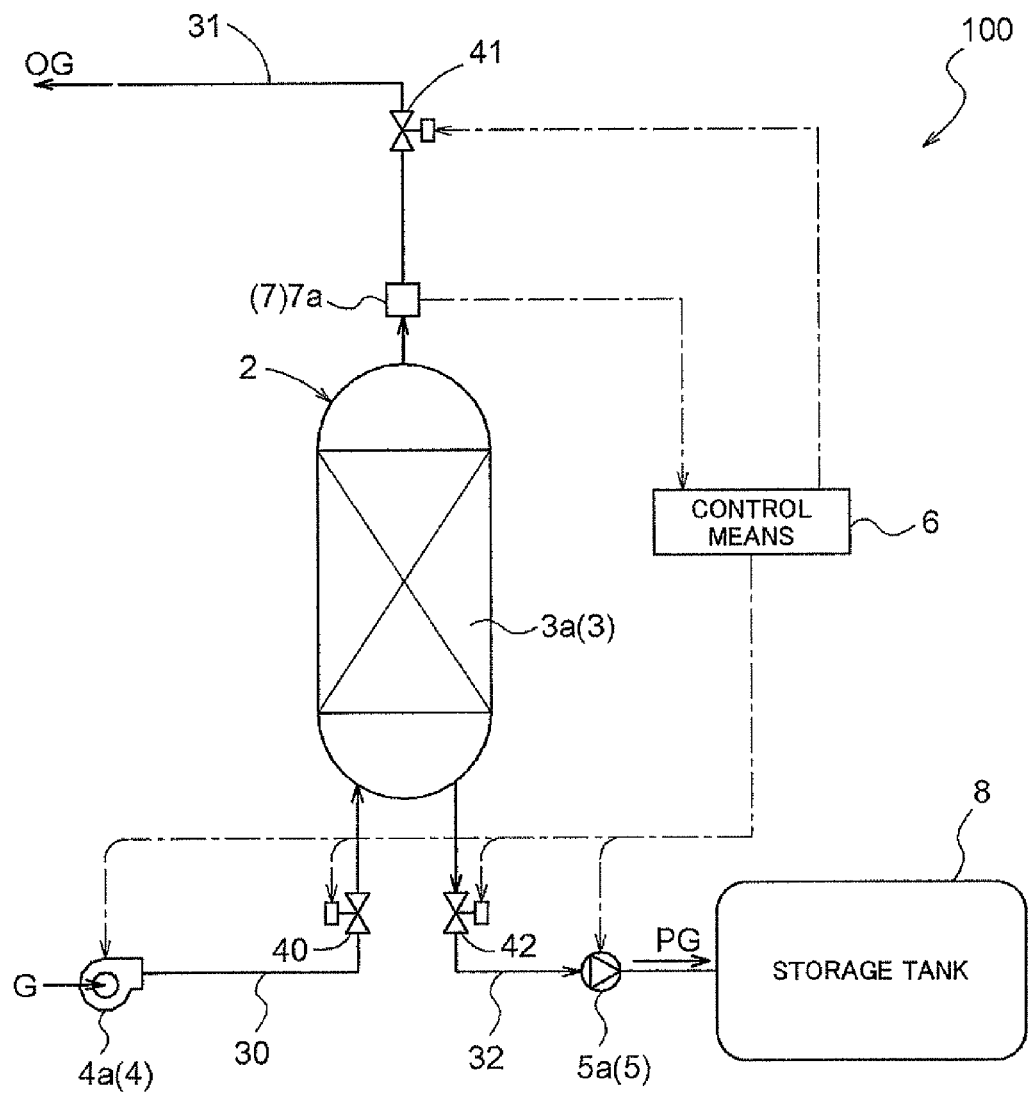
FIG. 1 is a schematic structural view showing the structure of the flammable gas concentration device according to Embodiment 1.

FIG. 1 is a schematic diagram showing the structure of the present device 100. Specifically, the present device 100 is provided with an adsorption tower 2 filled with an adsorbent 3 as shown in FIG. 1, a feeding means 4 for feeding a raw gas G and discharging an exhaust gas OG, a collection means 5 for collecting a (highly concentrated) post-concentration flammable gas PG, a control means 6 for controlling the feeding means 4 and the collection means 5, and an adsorption completion detection means 7 for detecting completion of adsorption of the flammable gas in the adsorbent 3 inside the adsorption tower 2.

A detailed description will be given hereinafter, but the when the present device 100 is installed in a coal mine, a ventilator (blower) 4a is used as the feeding means 4. Specifically, coal mine gas (raw gas G) generated from within the coal mine can be drawn in and fed to the adsorption tower 2 essentially at atmospheric pressure by the ventilator 4a without compressing the raw gas G. A vacuum pump 5a is used as the collection means 5.

The adsorption tower 2 is filled with an adsorbent 3 capable of adsorbing a flammable gas, and is configured so that the flammable gas in the raw gas G that is fed to the adsorption tower 2 can be selectively adsorbed.

The raw gas G herein is a gas that includes air and a flammable gas, and may be coal mine gas, for example, that includes air and methane gas. The flammable gas is not particularly limited as long as the gas is flammable, but may be methane gas included in coal mine gas, for example. In the description hereinafter, the raw gas G is coal mine gas G, and the raw gas G is assumed to be a gas that includes air, and methane gas as the flammable gas. The coal mine gas G is a gas generated from a coal mine, and about 20 to 40 vol % of methane gas and about 60 to 80 vol % of air (primarily including nitrogen gas and oxygen gas) are included in the coal mine gas G according to conditions.

The adsorbent 3 is not particularly limited insofar as the adsorbent is capable of selectively adsorbing a flammable gas, and a methane adsorbent 3a may be used as the adsorbent 3, which is at least one adsorbent selected from the group that includes active carbon, zeolite, silica gel, and an organic metal complex (copper fumarate, copper terephthalate, copper cyclohexane dicarboxylate, and the like) having an average micropore diameter of 4.5 to 15 Å as measured by the MP method, and a methane gas adsorption of 20 Ncc/g or higher at atmospheric pressure and 298 K. The abovementioned average micropore diameter is preferably 4.5 to 10 Å, and more preferably 5 to 9.5 Å, and the abovementioned methane adsorption is preferably 25 Ncc/g or higher. Such an active carbon is obtained by forming a carbonaceous material in which a carbon compound obtained by completely carbonizing palm husk or palm husk carbon in nitrogen gas at 600° C. is ground into grains having a diameter of 1 to 3 mm is activated at 860° C. in an atmosphere that includes 10 to 15 vol % of water vapor, 15 to 20 vol % of carbon dioxide, and nitrogen as the remainder using a batch-style flow activation oven having an inner diameter of 50 mM.

Through the use of a methane adsorbent 3a capable of selectively adsorbing methane gas at atmospheric pressure and 298 K as the adsorbent 3, methane gas can be adequately adsorbed to the methane adsorbent 3a even in conditions of atmospheric pressure and 298 K.

Specifically, when the methane adsorption at atmospheric pressure and 298 K is less than 20 Ncc/g, the methane adsorption performance at low pressure (particularly at about atmospheric pressure) is reduced, the methane concentration of the post-concentration methane gas is reduced, and the quantity of the methane adsorbent 3a must be increased and the size of the device must be increased in order to maintain the adsorption performance. The upper limit of the abovementioned methane adsorption is not particularly limited, but the methane adsorption currently obtained in the methane adsorbent 3a is about 40 Ncc/g or lower.

When the average micropore diameter as measured by the MP method is smaller than 4.5 Å, the adsorption of oxygen gas and nitrogen gas increases, the methane concentration in the post-concentration methane gas is reduced, the average micropore diameter approaches the methane molecular diameter, the adsorption rate decreases, the methane adsorption performance is reduced, and adsorption becomes impossible. On the other hand, when the average micropore diameter as measured by the MP method is greater than 15 Å, the methane adsorption performance at low pressure (particularly at about atmospheric pressure) is reduced, the methane concentration of the post-concentration methane gas is reduced, and the quantity of the methane adsorbent 3a must be increased and the size of the device increased in order to maintain the adsorption performance.

Consequently, the adsorbent is preferably a methane adsorbent 3a that is at least one adsorbent selected from the group that includes active carbon, zeolite, silica gel, and an organic metal complex having an average micropore diameter of 4.5 to 15 Å as measured by the MP method, and a methane gas adsorption of 20 Ncc/g or higher at atmospheric pressure and 298 K.

Figure 2:
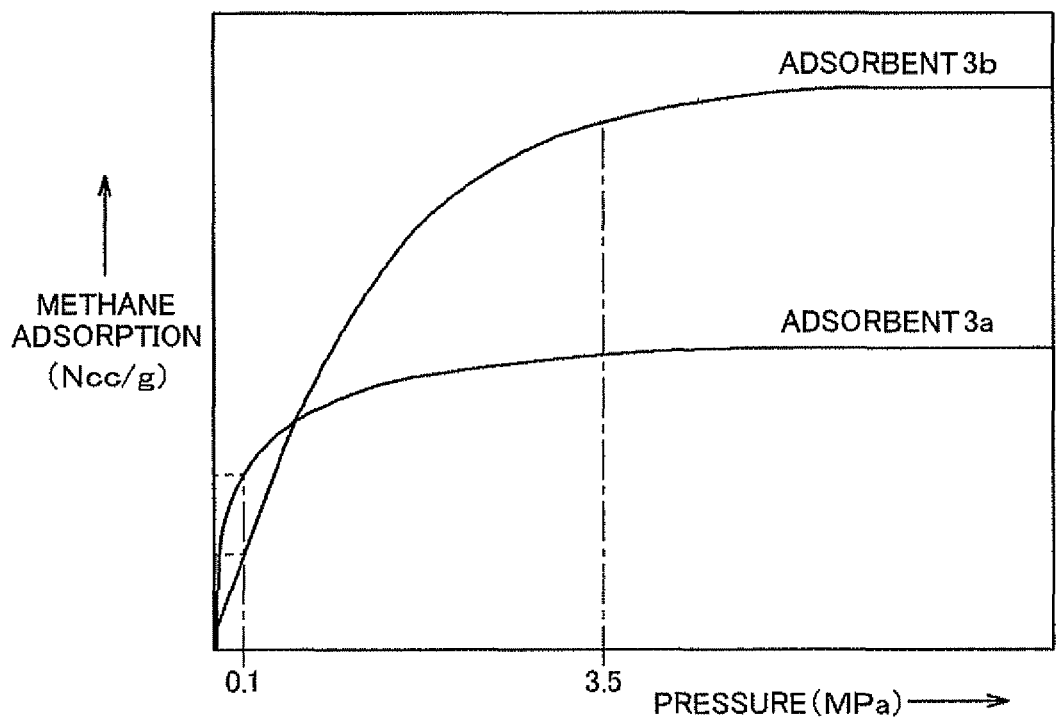
FIG. 2 is a diagram showing the adsorption characteristics of the methane adsorbent 3a in the present application.

Furthermore, the volume of micropores having an average micropore diameter of 10 Å or less as measured by the HK method may be 50% or more, preferably 70% or more, and more preferably 80% or more of the total micropore volume in the methane adsorbent 3a. In this case, since the volume of micropores having an average micropore diameter of 10 Å or less that are capable of selectively adsorbing methane gas accounts for 50% or more of the total micropore volume, the amount of methane gas that can be adsorbed at atmospheric pressure (about 0.1 MPa) is increased, and methane gas can be adequately adsorbed even at atmospheric pressure. Specifically, as shown in FIG. 2, in the methane adsorbent 3a having an average micropore diameter of 10 Å or less, the methane adsorption at atmospheric pressure (about 0.1 MPa) is greater than that of the methane adsorbent 3b in which the average micropore diameter is larger than 10 Å, and the methane adsorbent 3a can be suitably used in a case in which methane gas is adsorbed basically at atmospheric pressure, as in the present device 100. It is sufficient insofar as the volume of micropores for which the average micropore diameter is 4 Å or greater and 10 Å or smaller, which is the measurable range, is 50% or more of the total micropore volume. It is more preferred in the methane adsorbent 3a if the volume of micropores for which the average micropore diameter is 4.5 Å or greater and 10 Å or smaller is 50% or more of the total micropore volume.

The nitrogen adsorption of the methane adsorbent 3a at a relative pressure of 0.013 that corresponds to an average micropore diameter of 10 Å as measured by the HK method in the nitrogen adsorption at 77 K may be 50% or more, preferably 70% or more, and more preferably 80% or more of the nitrogen adsorption at a relative pressure of 0.99 that corresponds to the total micropore volume. In this case, the adsorption at a relative pressure of 0.99 represents the total micropore volume, and the adsorption at a relative pressure of 0.013 represents the volume of micropores having an average micropore diameter of 10 Å or less, and the ratio of these values indicates that the ratio of micropores having an average micropore diameter of 10 Å or less is higher, in the same manner as described above. As a result, methane gas near atmospheric pressure can be easily and efficiently concentrated even when a mixed gas of methane gas and air is used as the raw gas.

A feeding path 30 that is a path of the coal mine gas G fed by the feeding means 4 described hereinafter; a discharge path 31 that is a path of the exhaust gas OG in the coal mine gas G fed by the feeding means 4 described hereinafter and not adsorbed to the adsorbent 3; and a collection path 32 that is a path of the highly concentrated post-concentration methane gas PG that is collected by the collection means 5 described hereinafter are each connected to the adsorption tower 2.

A feeding path switch valve 40 capable of adjusting the feeding of the coal mine gas G is provided to the feeding path 30 in which the coal mine gas G is fed, and feeding of the coal mine gas G can be adjusted by control of the control means 6 described hereinafter.

A discharge path switch valve 41 capable of adjusting the discharging of the exhaust gas OG is provided to the discharge path 31 in which the exhaust gas OG is discharged, and discharging of the exhaust gas OG can be adjusted by control of the control means 6 described hereinafter.

A collection path switch valve 42 capable of adjusting the flow of post-concentration methane gas PG is provided to the collection path 32 through which the post-concentration methane gas PG passes during collection thereof, and the flow of the post-concentration methane gas PG can be adjusted by control of the control means 6 described hereinafter.

The specific adjustment operations of the feeding path switch valve 40, the discharge path switch valve 41, and the collection path switch valve 42 are the opening and closing thereof by the control means 6, and this opening and closing will be described hereinafter.

The feeding means 4 is a means provided on the feeding path 30 in order to feed the coal mine gas G through the feeding path 30 to the adsorption tower 2 and adsorb the methane gas in the coal mine gas G to the methane adsorbent 3a inside the adsorption tower 2, and is not particularly limited insofar as the feeding means 4 is capable of feeding the coal mine gas G without increasing the pressure thereof, and a ventilator 4a, for example, may be used as the feeding means 4.

In terms of operation, the feeding means 4 is also a means for discharging the exhaust gas OG in the coal mine gas G fed to the adsorption tower 2 that is not adsorbed to the methane adsorbent 3a to the space outside of the adsorption tower 2 through the discharge path 31.

Specifically, the feeding means 4 is capable of discharging the exhaust gas OG (gas primarily composed of nitrogen gas and oxygen gas that has an extremely low methane concentration) through the discharge path 31 while sending the coal mine gas G into the adsorption tower 2 at near atmospheric pressure without a pressure increase, and causing the methane gas in the coal mine gas G to be adsorbed.

The collection means 5 is a means for decreasing the pressure inside the adsorption tower 2 below atmospheric pressure and desorbing the methane gas adsorbed to the methane adsorbent 3a inside the adsorption tower 2, collecting the desorbed and highly concentrated post-concentration methane gas PS through the collection path 32, and storing the highly concentrated methane gas PG in a storage tank 8. Specifically, the collection means 5 is not particularly limited insofar as the collection means 5 is capable of reducing the pressure inside the adsorption tower 2, and a vacuum pump 5a, for example, may be used as the collection means 5.

The adsorption completion detection means 7 is a means for detecting the time at which the methane adsorption capability of the methane adsorbent 3a inside the adsorption tower 2 reaches a limit, i.e., the time at which methane gas adsorption is completed (breakthrough point), and is composed of a methane concentration detection means 7a, for example. The methane concentration detection means 7a used as the adsorption completion detection means 7 is provided to the discharge path 31 connected to the adsorption tower 2, and detects the time at which the methane concentration of the exhaust gas OG discharged to the discharge path 31 reaches a predetermined concentration, and transmits the detection result as a time of completion of methane gas adsorption, to the control means 6 described hereinafter. It is thereby possible to determine that the methane adsorption performance of the methane adsorbent 3a has reached a limit, and to promptly stop feeding the coal mine gas G and determine that the methane gas should be desorbed from the methane adsorbent 3a in such cases as when it is detected that the methane gas in the exhaust gas OG is at the predetermined concentration.

It is sufficient insofar as the storage tank 8 is capable of safely storing the highly concentrated post-concentration methane gas PG, and the use of an adsorption-type gas tank is more preferred.

The control means 6 is composed of a microcomputer provided with a storage medium composed of memory or the like, a CPU, and an input-output unit, and the feeding means 4, the collection means 5, the adsorption completion detection means 7, the feeding path switch valve 40, the discharge path switch valve 41, the collection path switch valve 42, and other components can be controlled through execution of a predetermined program by the computer.

Figure 3:
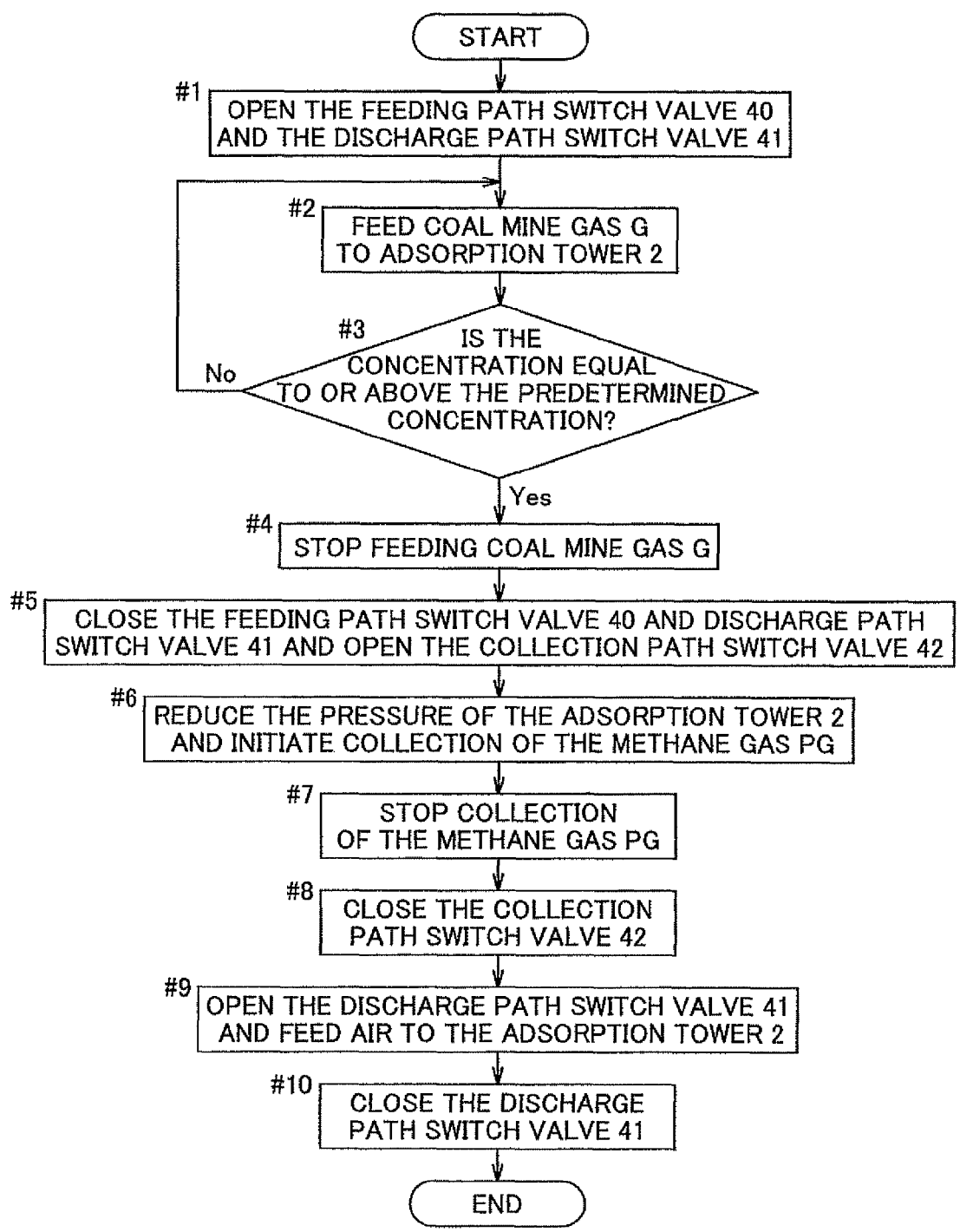
FIG. 3 is a flow diagram sowing the operation of the flammable gas concentration device in Embodiment 1.

The operation of concentrating methane gas by the present device 100 will next be specifically described using FIG. 3. In summary, the present device 100 executes A: a methane gas adsorption step and B: a methane gas desorption step.

The feeding path switch valve 40 and the discharge path switch valve 41 are opened (step 1) from a state in which the feeding path switch valve 40, the discharge path switch valve 41, and the collection path switch valve 42 are closed.

The coal mine gas G is fed through the feeding path 30 into the adsorption tower 2 by the ventilator 4a, the methane gas is adsorbed to the methane adsorbent 3a, and the exhaust gas OG not adsorbed to the methane adsorbent 3a from the coal mine gas G fed into the adsorption tower 2 is discharged into the space outside the adsorption tower 2 through the discharge path 31 (step 2). These steps 1 and 2 are the methane gas adsorption step.

Figure 4:
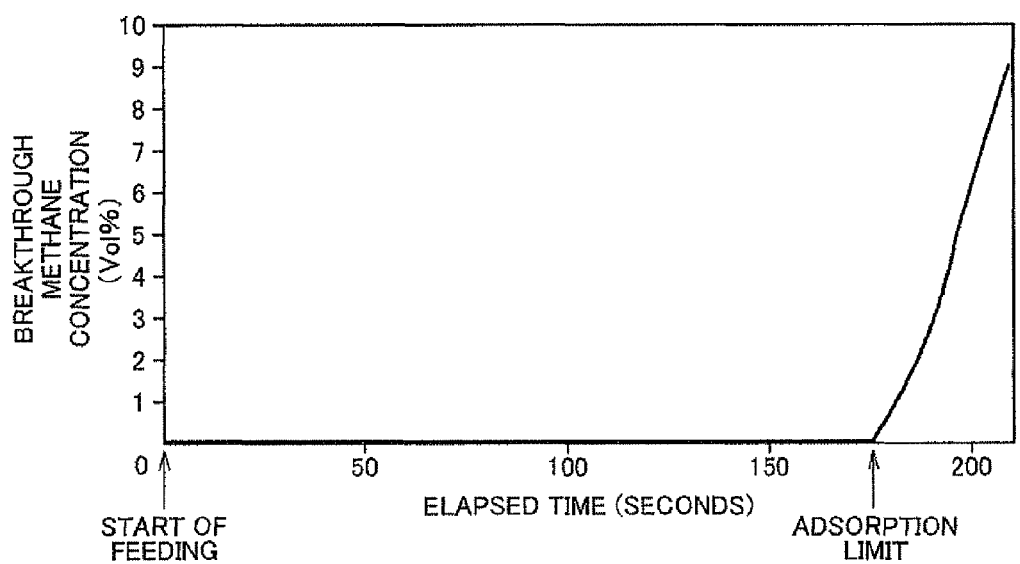
FIG. 4 is a graph showing the change in the methane concentration in the exhaust gas OG as relates to elapsed time in the methane gas adsorption step.

The coal mine gas G is thereby fed into the adsorption tower 2 at atmospheric pressure, and it is possible to prevent the valuable methane gas from flowing out into the exhaust gas OG while causing the methane gas to be selectively adsorbed to the methane adsorbent 3a. Specifically, as shown in FIG. 4, until a predetermined time has elapsed, the methane gas is almost completely adsorbed, there is no flow to the outside of the adsorption tower 2, and the methane concentration in the exhaust gas OG is extremely low. The concentration is therefore outside the explosive range.

The methane concentration detection means 7a then detects whether the methane gas concentration in the exhaust gas OG discharged to the discharge path 31 is equal to or above a predetermined concentration (step 3). When the detected methane concentration is not equal to or above the predetermined concentration, the process returns to step 2, and feeding of the coal mine gas G is continued. When the detected methane concentration is equal to or above the predetermined concentration, feeding of the coal mine gas G to the adsorption tower 2 is stopped (step 4).

The time of completion of methane gas adsorption to the methane adsorbent 3a can thereby be known, discharge of the coal mine gas G that includes methane gas from inside the adsorption tower 2 to the outside can be prevented as much as possible, and a transition to the methane gas desorption step can be appropriately performed.

Specifically, as shown in FIG. 4, during the time elapsed while the methane gas adsorption step is executed, the methane concentration in the exhaust gas OG is kept extremely low until the predetermined time has elapsed, but when the methane adsorbent 3a reaches the methane adsorption limit (breakthrough), the methane concentration abruptly increases. This phenomenon can be utilized to determine whether the methane adsorbent 3a inside the adsorption tower 2 has reached the adsorption limit.

Then, after feeding of the coal mine gas G into the adsorption tower 2 has stopped, the feeding path switch valve 40 and the discharge path switch valve 41 are closed, and the collection path switch valve 42 is opened (step 5). The pressure inside the adsorption tower 2 is then reduced lower than atmospheric pressure by the vacuum pump 5a, collection of the highly concentrated post-concentration methane gas PG through the collection path 32 is initiated (step 6) while the adsorbed methane gas is desorbed from the methane adsorbent 3a, and the highly concentrated post-concentration methane gas PG is stored in the storage tank 8. When the pressure inside the adsorption tower 2 has been reduced to a predetermined pressure, collection of the post-concentration methane gas PG is stopped (step 7), and the collection path switch valve 42 is closed (step 8). These steps 5 through 8 are the methane gas desorption step.

The methane gas is thereby adsorbed to the methane adsorbent 3a, and it is possible to concentrate the methane gas to a high concentration while reducing the methane concentration in the exhaust gas OG, and to prevent the concentration of the exhaust gas OG and the post-concentration methane gas PG from entering the explosive range.

Figure 5:
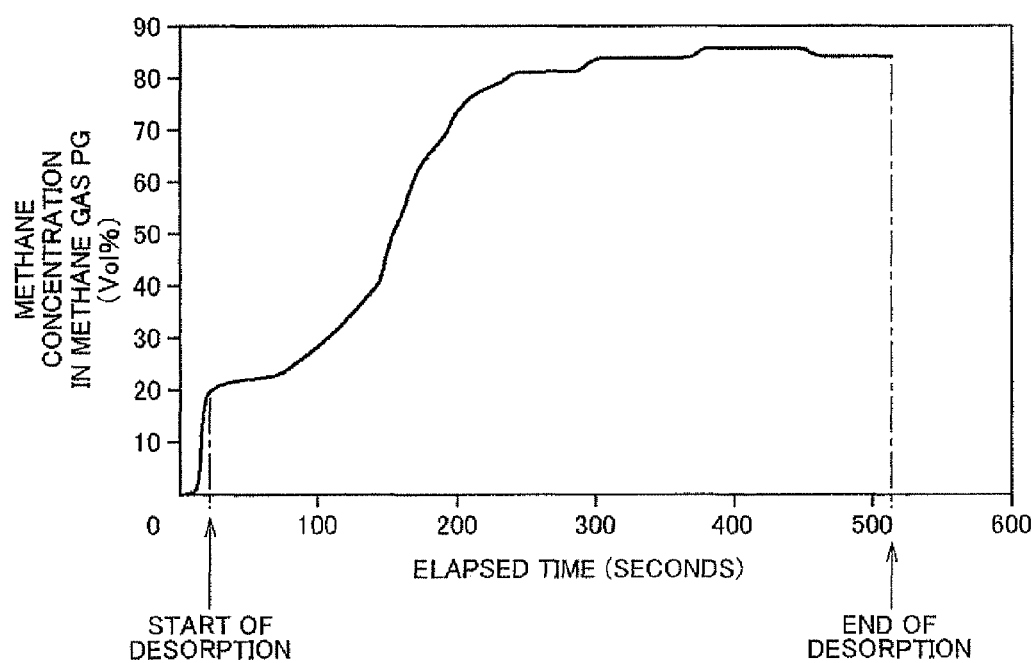
FIG. 5 is a graph showing the change in the methane concentration in the post-concentration methane gas PG as relates to elapsed time in the methane gas desorption step.

Specifically, as shown in FIG. 5, from the start of the methane gas desorption step until completion of the methane gas desorption step, the methane concentration in the post-concentration methane gas PG increases as time elapses. In the same manner, the pressure inside the adsorption tower 2 gradually decreases from atmospheric pressure to a near vacuum as time elapses, and the methane concentration in the post-concentration methane gas PG accordingly increases, as shown in FIG. 6. In other words, it is apparent that when the pressure is reduced in the methane gas desorption step, a certain amount of time elapses, and the inside of the adsorption tower 2 approaches a vacuum, the methane concentration of the collected post-concentration methane gas PG accordingly increases. Consequently, a state occurs in which the methane concentration in the post-concentration methane gas PG is extremely high, and the concentration can be prevented from entering the explosive range. The methane concentration is kept low in the exhaust gas OG as well in the manner described above, and the concentration can be prevented from entering the explosive range.

The discharge path switch valve 41 is then opened, air is fed through the discharge path 31 into the adsorption tower 2 (step 9), and the discharge path switch valve 41 is then closed (step 10).

The pressure inside the adsorption tower 2 is thereby increased to near atmospheric pressure, and adsorption of methane gas in the subsequently executed methane gas adsorption step can be facilitated.

In the embodiment described above, methane gas can be efficiently adsorbed from the coal mine gas G to the methane adsorbent 3a at atmospheric pressure, the post-concentration methane gas PG as the product gas can be safely purified to a high concentration, and the concentration of the exhaust gas OG can be prevented from entering the explosive range.

A specific example will next be described in which the present device 100 was actually operated to purify a post-concentration highly concentrated methane gas PG.

EXAMPLE 1

Using a cylindrical vessel having a volume of 0.333 L as the adsorption tower 2, the adsorption tower 2 was filled with 206.7 g of the methane adsorbent 3a. As shown in Tables 1 and 2, the methane adsorbent 3a used was active carbon having the following properties: an average micropore diameter of 8.5 Å as measured by the MP method, a ratio of volume of micropores having an average micropore diameter of 10 Å or less as measured by the HK method, relative to the total micropore volume, of 83% (the nitrogen adsorption ratio at a relative pressure of 0.013 was the same), a specific surface area of 1025 $m^2/g$, a total micropore volume of 0.45 mL/g, and a methane adsorption of 27 Ncc/g at atmospheric pressure and 298 K.

Vacuum drying was then performed while the air was discharged in advance, and the adsorption tower 2 from which impurities had been removed was filled to atmospheric pressure with air. At this time, 1.87 L of air (0.39 L of oxygen and 1.48 L of nitrogen) was present in the adsorption tower 2.

A mixed gas of 21.05% methane and 78.95% air as the simulated coal mine gas G was then fed into the adsorption tower 2 at atmospheric pressure by the ventilator 4a. The feeding rate at this time was 2 L/M. The pressure inside the adsorption tower 2 at this time was 3.6 KPa.

As shown in FIG. 4, feeding of the coal mine gas G was performed for approximately 190 seconds until the methane adsorbent 3a reached the adsorption limit (breakthrough) and the methane concentration in the exhaust gas OG reached 5 vol %.

In conjunction with feeding of the coal mine gas G, 5.48 L (0.01 L of methane gas, 5.47 L of oxygen and nitrogen together) of the exhaust gas OG were discharged.

The pressure inside the adsorption tower 2 was reduced to −97 KPa by the vacuum pump 5a, and 2.37 L (1.08 L of methane gas (average methane concentration of 45.6 vol %), 0.25 L of oxygen (average oxygen concentration of 10.4 vol %), 1.04 L of nitrogen) of post-concentration methane gas PG were obtained.

As a result, as shown in FIG. 4, it is apparent that the methane concentration in the exhaust gas OG was kept extremely low until the methane adsorbent 3a reached the adsorption limit (breakthrough), and the concentration of the exhaust gas OG was prevented from entering the explosive range. Although the concentration of oxygen gas included in the post-concentration methane gas PG averaged 10.4 vol %, which is barely within the explosive concentration range, the methane concentration averaged 45.6 vol %, which was a high concentration, and the concentration was prevented from entering the explosive range. The reason for this was that highly concentrated methane gas was obtained by reducing the pressure of the adsorption tower 2 to a vacuum state, as shown in FIG. 6. As shown in FIG. 5, the methane concentration was 20 vol % or higher over time, and was prevented from reaching a concentration within the explosive range.

COMPARATIVE EXAMPLE 1

Calculations were performed by an adsorption simulation in which molecular sieve carbon was filled into the adsorption tower 2 as an oxygen adsorbent, oxygen was adsorbed from coal mine gas, and methane gas was concentrated. A gas (methane gas (21 vol %), oxygen (17 vol %), nitrogen (62 vol %)) corresponding to coal mine gas was fed into the adsorption tower 2 at a feed rate of 4000 $m^3/H$. The pressure in the adsorption tower 2 during feeding was 0.6 MPa, and the temperature was 30° C. This Comparative Example 1 was a simulation of the technique of Patent Document 1 previously described.

An exhaust gas containing methane gas (average methane concentration of 18.8 vol %), oxygen (average oxygen concentration of 25.6 vol %), and nitrogen was discharged from the adsorption tower 2.

Post-concentration methane gas containing methane gas (methane concentration of 23 vol %), oxygen (oxygen concentration of 8.4 vol %), and nitrogen was discharged as the post-concentration gas from the adsorption tower 2.

A study of the potential for explosion due to the concentration of methane gas and the reduction of the oxygen concentration based on these results revealed the following. Although the oxygen concentration in the post-concentration methane gas was reduced to 10 vol % or less, and the concentration was prevented from entering the explosive range, there was extremely minimal concentration of methane gas. The average oxygen concentration in the exhaust gas increased and instead undesirably approached a concentration within the explosive range. There was also a risk of the average methane concentration in the exhaust gas entering the explosive range over time.

Consequently, in the present device 100 according to Example 1 as described above, since the concentration was prevented from entering the explosive range such as in Comparative Example 1, methane gas could be safely concentrated.

Tables 1 and 2 show the relationship between the physical properties of active carbon and the methane adsorption when active carbon is used as the preferred methane adsorbent 3a.

EXAMPLES 1 through 7

Tables 1 and 2 show the oxygen concentration in the methane gas PG and the methane concentration in the highly concentrated methane gas PG as the product gas obtained by the present device 100 when the active carbon of Example 1 was used as the methane adsorbent 3a, as well as when the active carbon described in Examples 2 through 7 was used. All of these active carbons were active carbon having extremely high methane gas adsorption performance, in which the average micropore diameter as measured by the MP method was within 4.5 to 15 Å, the methane gas adsorption at atmospheric pressure (0.1 MPa) and 298 K was 20 Ncc/g or higher, and the volume of micropores having an average micropore diameter of 10 Å or less as measured by the HK method was 50 vol % or higher of the total micropore volume.

When the active carbon of Examples 1 through 7 was used, the concentration of the highly concentrated methane gas PG as the product gas was 37.5 vol % at the lowest, and the oxygen concentration in the methane gas PG was 11.8 vol % at the highest. Consequently, it is apparent that the concentration of the product gas was always prevented from entering the explosive range.

TABLE 1

| Active carbon | Specific surface area ($m^2/g$) | Micropore volume (ml/g) | Average micropore diameter as measured by MP method (Å) | Methane adsorption at 0.1 MPa and 298 K (Ncc/g) |
|---|---|---|---|---|
| Example 1 | 1025 | 0.45 | 8.5 | 27 |
| Example 2 | 781 | 0.35 | 7.4 | 28 |
| Example 3 | 805 | 0.4 | 8.5 | 27 |
| Example 4 | 811 | 0.41 | 8.6 | 27 |
| Example 5 | 798 | 0.4 | 8.2 | 30 |
| Example 6 | 1427 | 0.7 | 9.1 | 29 |
| Example 7 | 1188 | 0.64 | 7.2 | 27 |
| Comparative Example 2 | 1555 | 1.05 | 12.7 | 13 |
| Comparative Example 3 | | | 4.0 | 0.3 |

TABLE 2

| Active carbon | Volume ratio of micropores 10 Å or less as measured by HK method (%) | Amount processed until methane gas breakthrough of 5 vol % (NL) | Methane concentration in product gas (Vol %) | Oxygen concentration in product gas (Vol %) |
|---|---|---|---|---|
| Example 1 | 83 | 6.2 | 45.6 | 10.4 |
| Example 2 | 85 | 6.3 | 41.7 | 11.2 |
| Example 3 | 85 | 6.1 | 43.1 | 10.6 |
| Example 4 | 83 | 6.4 | 43.1 | 10.5 |
| Example 5 | 85 | 5.9 | 39.0 | 11.6 |
| Example 6 | 73 | 5.5 | 37.5 | 11.8 |
| Example 7 | 69 | 4.7 | 40.2 | 11.4 |
| Comparative Example 2 | 39 | 2.4 | 32.2 | 13.2 |
| Comparative Example 3 | 98 | 0.9 | 8.5 | 31.2 |

COMPARATIVE EXAMPLE 2

As Comparative Example 2, Tables 1 and 2 show the oxygen concentration in the methane gas PG and the methane concentration in the highly concentrated methane gas PG as the product gas obtained by the present device 100 in a case in which active carbon was used in which the average micropore diameter as measured by the MP method was within 4.5 to 15 Å, the methane gas adsorption at atmospheric pressure (0.1 MPa) and 298 K was less than 20 Ncc/g, and the volume of micropores having an average micropore diameter of 10 Å or less as measured by the HK method was less than 50 vol % of the total micropore volume.

When the active carbon described in Comparative Example 2 was used, the methane concentration in the methane gas PG as the product gas was 32.2 vol %, which was not within the explosive range, but the oxygen concentration was 13.2 vol %, which was within the explosive range in which explosion is possible, in contrast with Examples 1 through 7 described above.

COMPARATIVE EXAMPLE 3

As Comparative Example 3, Tables 1 and 2 show the oxygen concentration in the methane gas PG and the methane concentration in the highly concentrated methane gas PG as the product gas obtained by the present device 100 in a case in which active carbon was used in which the average micropore diameter as measured by the MP method was outside the range of 4.5 to 15 Å, the methane gas adsorption at atmospheric pressure (0.1 MPa) and 298 K was less than 20 Ncc/g, and the volume of micropores having an average micropore diameter of 10 Å or less as measured by the HK method was 50 vol % or more of the total micropore volume.

When the active carbon described in Comparative Example 3 was used, since the methane concentration in the methane gas PG as the product gas was 8.5 vol %, and the oxygen concentration was 31.2 vol %, both concentrations were within the explosive range, and the potential for explosion was extremely high in comparison to that of Examples 1 through 7.

Consequently, in the present device 100 in which the active carbon described in Examples 1 through 7 was used as the methane adsorbent 3a as described above, since the concentration was prevented from entering the explosive range such as in Comparative Examples 2 and 3, it was possible to safely concentrate the methane gas.

The relationship between the oxygen concentration and the methane concentration in the obtained product gas when the methane concentration in the raw gas G was varied is described below.

The concentration of the coal mine gas G was varied, and highly concentrated methane gas PG (product gas) was obtained by the present device 100 using the same active carbon as in Example 1. Specifically, the methane gas concentration of the raw gas G heretofore described was approximately 21 vol %, but this methane concentration was set to 30 vol % and 40 vol %.

As a result, when coal mine gas G having a methane concentration of 30 vol % was fed, the methane concentration in the product gas was 57 vol %, and the oxygen concentration was 8 vol % in a single adsorption/desorption operation cycle. When coal mine gas G having a methane concentration of 40 vol % was fed, the methane concentration in the product gas was 68 vol %, and the oxygen concentration was 6 vol %.

Consequently, it was confirmed that even when the methane concentration of the fed coal mine gas G is varied, not only is the methane concentration in the product gas outside the explosive range, but the oxygen concentration is also 10 vol % or less and outside the explosive range, and methane gas can be safely concentrated in the present device 100 using the active carbon of Example 1.

As shown in Table 2, since the quantity of coal mine gas G process before reaching a methane concentration of 5 vol % was higher for the active carbon of Examples 1 through 7 than for the active carbon of Comparative Examples 2 and 3, it is apparent that excellent methane gas adsorption performance was obtained, and extremely efficient processing was performed when the active carbon was used to concentrate methane gas using the present device 100.

[Embodiment 2]

In Embodiment 1 described above, the present device 100 was configured so as to sequentially execute the flammable gas adsorption step and the flammable gas desorption step, but the device may also be configured so as to execute a purge step or the like after completion of the flammable gas adsorption step and prior to the flammable gas desorption step, as described hereinafter.

In a case in which a purge step or the like is executed, the present device 200 may be configured as described below in addition to having the configuration of the present device 100. Structures, examples, and the like that are the same as in Embodiment 1 will not be described.

Figure 7:
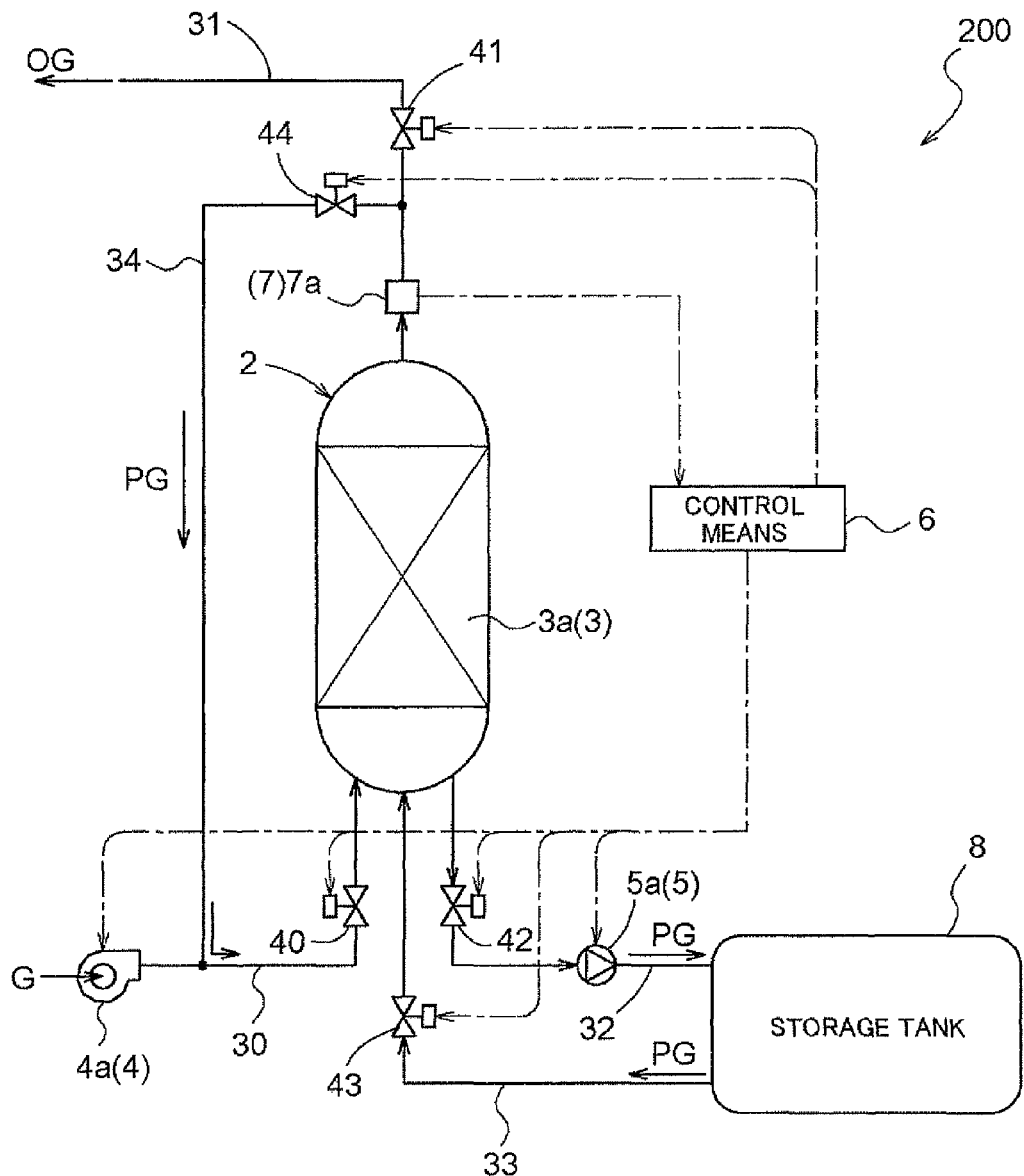
FIG. 7 is a schematic structural diagram showing the structure of the flammable gas concentration device according to Embodiment 2.

Specifically, in addition to the structure of the present device 100, the present device 200 shown in FIG. 7 is provided with a purge path 33 through which the highly concentrated methane gas PG passes in the purge step described hereinafter when flowing into the adsorption tower 2 from the storage tank 8 in which the post-concentration highly concentrated methane gas PG is stored.

A purge gas recovery path 34 for re-circulating to the feeding path 30 the exhaust gas OG in the adsorption tower 2 and the post-concentration methane gas PG discharged through the discharge path 31 from within the adsorption tower 2 in the purge step described hereinafter is also provided between the discharge path 31 and the feeding path 30.

A purge path switch valve 43 capable of adjusting the flow of the post-concentration methane gas PG is provided to the purge path 33, and the flow of the post-concentration methane gas PG can be adjusted by control of the control means 6 described hereinafter.

A purge gas recovery path switch valve 44 is also provided to the purge gas recovery path 34, and the re-circulation of the exhaust gas OG and the post-concentration methane gas PG can be adjusted by control of the control means 6 described hereinafter.

Figure 8:
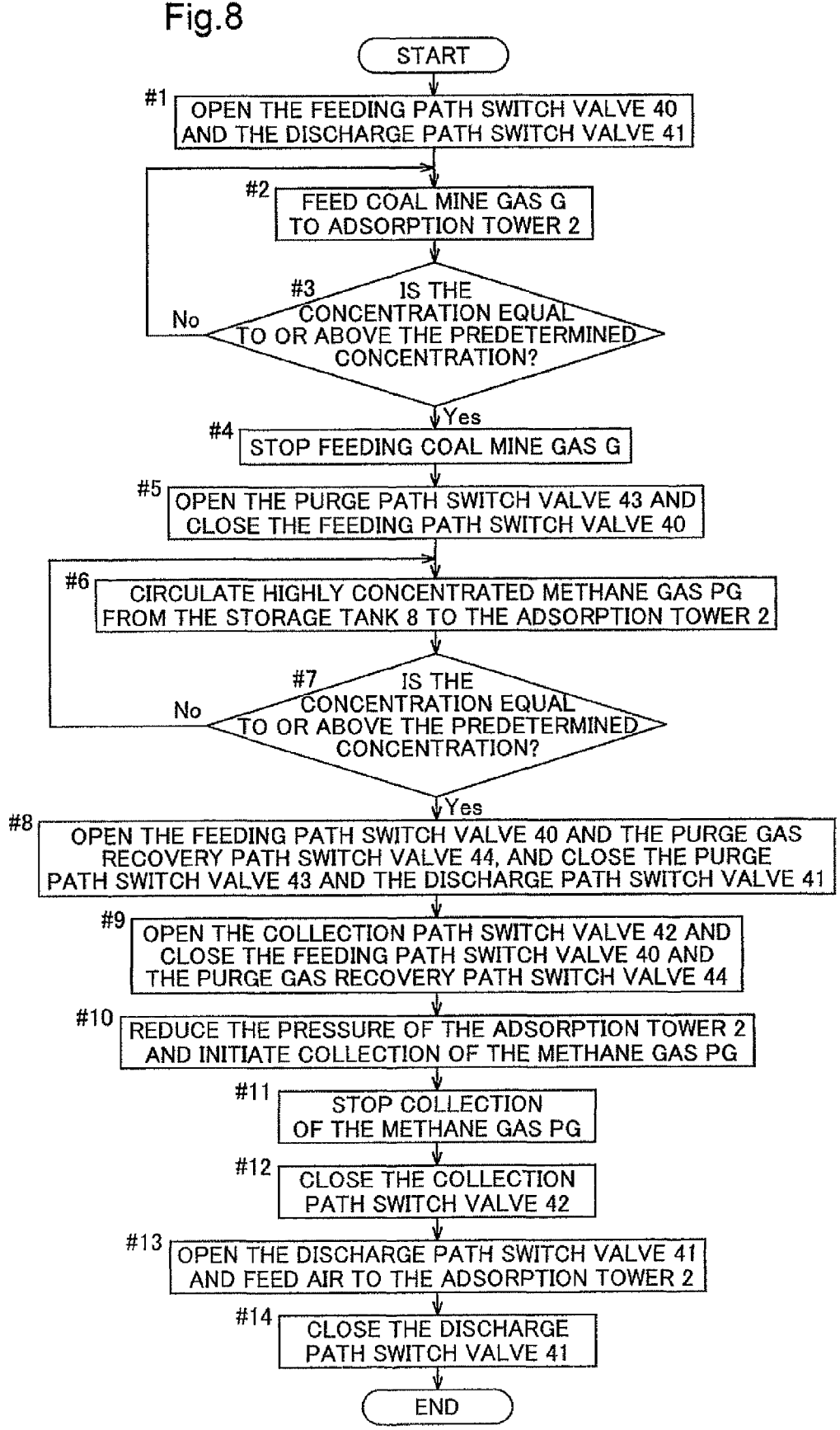
FIG. 8 is a flow diagram showing the operation of the flammable gas concentration device in Embodiment 2.

The operation whereby methane gas is concentrated by the present device 200 will next be specifically described using FIG. 8. In summary, the present device 200 sequentially executes A: the methane gas adsorption step, B: the purge step, C: the recirculation step, and D: the methane gas desorption step.

First, the feeding path switch valve 40 and the discharge path switch valve 41 are opened (step 1) from a state in which the feeding path switch valve 40, the discharge path switch valve 41, the collection path switch valve 42, the purge path switch valve 43, and the purge gas recovery path switch valve 44 are closed.

The coal mine gas G is fed through the feeding path 30 into the adsorption tower 2 by the ventilator 4a, the methane gas is adsorbed to the methane adsorbent 3a, and the exhaust gas OG not adsorbed to the methane adsorbent 3a from the coal mine gas G fed into the adsorption tower 2 is discharged into the space outside the adsorption tower 2 through the discharge path 31 (step 2). These steps 1 and 2 are the methane gas adsorption step.

The coal mine gas G is thereby fed into the adsorption tower 2 at atmospheric pressure, and it is possible to prevent the valuable methane gas from flowing out into the exhaust gas OG while causing the methane gas to be selectively adsorbed to the methane adsorbent 3$a$. Specifically, as shown in FIG. 4, until a predetermined time has elapsed, the methane gas is almost completely adsorbed, there is no flow to the outside of the adsorption tower 2, and the methane concentration in the exhaust gas OG is extremely low. The concentration is therefore outside the explosive range.

The methane concentration detection means 7$a$ then detects whether the methane gas concentration in the exhaust gas OG discharged to the discharge path 31 is equal to or above a predetermined concentration (step 3). When the detected methane concentration is not equal to or above the predetermined concentration, the process returns to step 2, and feeding of the coal mine gas G is continued. When the detected methane concentration is equal to or above the predetermined concentration, feeding of the coal mine gas G to the adsorption tower 2 is stopped (step 4).

The time of completion of methane gas adsorption to the methane adsorbent 3$a$ can thereby be known, discharge of the coal mine gas G that includes methane gas from inside the adsorption tower 2 to the outside can be prevented as much as possible, and a transition to the subsequently executed purge step, recirculation step, and methane gas desorption step can be appropriately performed.

Specifically, as shown in FIG. 4, during the time elapsed while the methane gas adsorption step is executed, the methane concentration in the exhaust gas OG is kept extremely low until the predetermined time has elapsed, but when the methane adsorbent 3$a$ reaches the methane adsorption limit (breakthrough), the methane concentration abruptly increases. This phenomenon can be utilized to determine whether the methane adsorbent 3$a$ inside the adsorption tower 2 has reached the adsorption limit.

Then, after feeding of the coal mine gas G into the adsorption tower 2 has stopped, the purge path switch valve 43 is opened and the feeding path switch valve 40 is closed (step 5), and the highly concentrated methane gas PG for which concentration has been performed is flowed from the storage tank 8 into the adsorption tower 2 through the purge path 33 (step 6). These steps 5 and 6 are the purge step.

The gas (exhaust gas OG: primarily composed of nitrogen gas and oxygen gas) inside the adsorption tower 2 in which almost no methane gas is present is thereby driven out to the discharge path 31, the methane concentration in the adsorption tower 2 is increased, and the concentration of the subsequently collected post-concentration methane gas PG can be prevented from decreasing. Specifically, purification of highly concentrated methane gas PG is made possible by driving out the nitrogen gas, oxygen gas, and the like present in the adsorption tower 2, and particularly the gases remaining in the gaps of the methane adsorbent 3$a$.

After nearly all of the exhaust gas OG has been driven out, the post-concentration methane gas PG that flowed into the adsorption tower 2 is discharged to the discharge path 31, and the methane concentration detection means 7$a$ detects whether the methane concentration in the discharge path 31 has increased to or above a predetermined concentration (step 7). When a concentration equal to or above the predetermined concentration has not been reached, the process returns to step 6, and flow of the post-concentration methane gas PG into the adsorption tower 2 is continued. When the methane concentration in the discharge path 31 is equal to or above the predetermined concentration, the feeding path switch valve 40 and the purge gas recovery path switch valve 44 are opened, and the purge path switch valve 43 and discharge path switch valve 41 are closed (step 8). This step 8 is the recirculation step.

The post-concentration methane gas PG is thereby prevented from discharging into the space outside the adsorption tower 2 from the discharge path 31, the post-concentration methane gas PG can be made to flow again into the adsorption tower 2 from the feeding path 30, and the post-concentration methane gas PG can be effectively utilized.

The collection path switch valve 42 is then opened, and the feeding path switch valve 40 and purge gas recovery path switch valve 44 are closed (step 9). The pressure inside the adsorption tower 2 is then reduced lower than atmospheric pressure by the vacuum pump 5$a$, collection of the post-concentration methane gas PG through the collection path 32 is initiated (step 10) while the adsorbed methane gas is desorbed from the methane adsorbent 3$a$, and the methane gas is stored in the storage tank 8. When the pressure inside the adsorption tower 2 has been reduced to a predetermined pressure, collection of the post-concentration methane gas PG is stopped (step 11), and the collection path switch valve 42 is closed (step 12). These steps 9 through 12 are the methane gas desorption step.

The methane gas is thereby adsorbed to the methane adsorbent 3$a$, and it is possible to concentrate the methane gas to a high concentration while reducing the methane concentration in the exhaust gas OG, and to prevent the concentration of the exhaust gas OG and the post-concentration methane gas PG from entering the explosive range.

Specifically, as shown in FIG. 5 from the start of the methane gas desorption step until completion of the methane gas desorption step, the methane concentration in the post-concentration methane gas PG increases as time elapses. In the same manner, the pressure inside the adsorption tower 2 gradually decreases from atmospheric pressure to a near vacuum as time elapses, and the methane concentration in the post-concentration methane gas PG accordingly increases, as shown in FIG. 6. In other words, it is apparent that when the pressure is reduced in the methane gas desorption step, a certain amount of time elapses, and the inside of the adsorption tower 2 approaches a vacuum, the methane concentration of the collected post-concentration methane gas PG accordingly increases. Consequently, a state occurs in which the methane concentration in the post-concentration methane gas PG is extremely high, and the concentration can be prevented from entering the explosive range. The methane concentration is kept low in the exhaust gas OG as well in the manner described above, and the concentration can be prevented from entering the explosive range.

Furthermore, by performing the purge step or the recirculation step as in the present Embodiment 2 in the same conditions as in the abovementioned example, the methane gas PG as the product gas can be concentrated to a high concentration in which the average methane concentration is approximately 50 to 99 vol %, and the average oxygen concentration is approximately 0.2 to 10 vol % according to the amount of purge gas, and the concentration can be always prevented from entering the explosive range.

Figure 9:
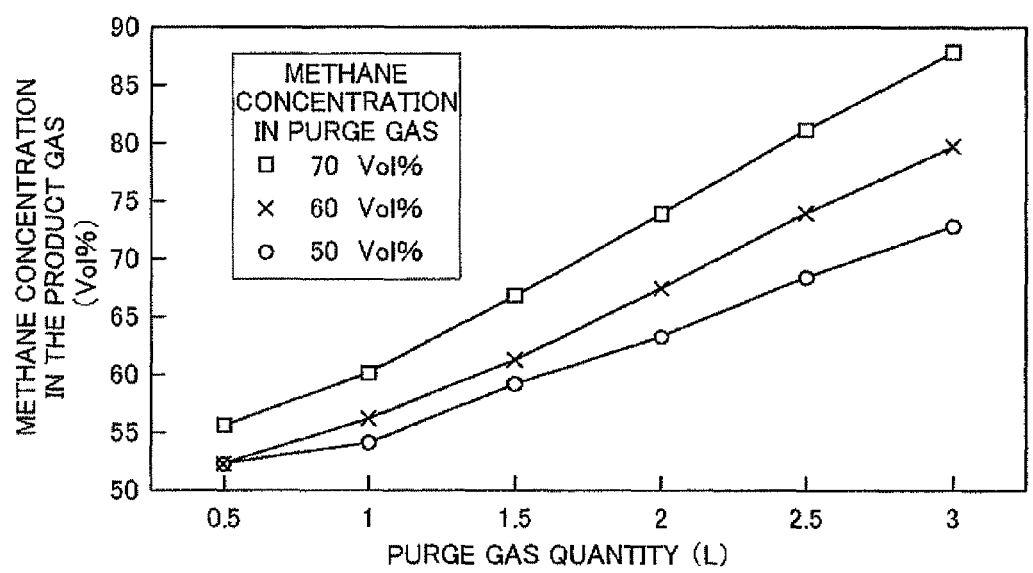
FIG. 9 is a graph showing the relationship between the purge gas quantity of each methane concentration and the methane concentration of the post-concentration methane gas PG in Embodiment 2.

The methane concentration of the purge gas and the amount of purge gas were actually varied during flow into the adsorption tower 2 through the purge path 33, using the post-concentration highly concentrated methane gas PG from the storage tank 8 as the purge gas in the purge step after completion of the methane gas adsorption step. The methane gas adsorbed in the adsorption tower 2 in this case was desorbed from the methane adsorbent 3a by reducing the pressure inside the adsorption tower 2, and the methane concentration of the post-concentration methane gas PG as the product gas stored in the storage tank 8 through the collection path 32 was measured. The results are shown in FIG. 9. FIG. 9 is a diagram showing the relationship between amount of purge gas and the methane concentration of the highly concentrated methane gas PG as the product gas when the methane concentration of the purge gas was varied to 50, 60, and 70 vol %.

As a result, it was clearly apparent that the methane concentration in the product gas is further enhanced by performing the purge step, in relation to the methane concentration (45.6 vol % at the highest) in the product gas shown in Table 2 of Embodiment 1. It was also demonstrated that the methane concentration in the product gas also increased, and that concentration to a higher concentration was made possible through the use of a purge gas having a higher methane concentration. A state occurs in which the methane concentration in the post-concentration methane gas PG (product gas) is extremely high, and the concentration can be prevented from entering the explosive range.

The discharge path switch valve 41 is then opened, air is fed into the adsorption tower 2 through the discharge path 31 (step 13), and the discharge path switch valve 41 is then closed (step 14).

The pressure inside the adsorption tower 2 is thereby increased to near atmospheric pressure, and the methane gas can easily be adsorbed in the subsequently executed methane gas adsorption step.

In the embodiments described above, methane gas can be efficiently adsorbed from the coal mine gas G to the methane adsorbent 3a at atmospheric pressure, the post-concentration methane gas PG as the product gas can be safely purified to a higher concentration, and the concentration of the exhaust gas OG can be prevented from entering the explosive range.

[Embodiment 3]

In Embodiment 2 described above, the present device 200 was configured using a single adsorption tower 2, but the present device 300 may be configured using a plurality of adsorption towers 2 as described hereinafter.

The present device 300 of Embodiment 3 is configured so as to execute a pressure equalization step among the plurality of adsorption towers 2, in addition to having the configuration of the present device 200 of Embodiment 2.

In a case in which the pressure equalization step is executed among a plurality of adsorption towers 2 in this manner, the present device 300 may be configured as described below in addition to having the configuration of the present device 200. Structures, examples, and the like that are the same as in Embodiment 2 will not be described.

Figure 10:
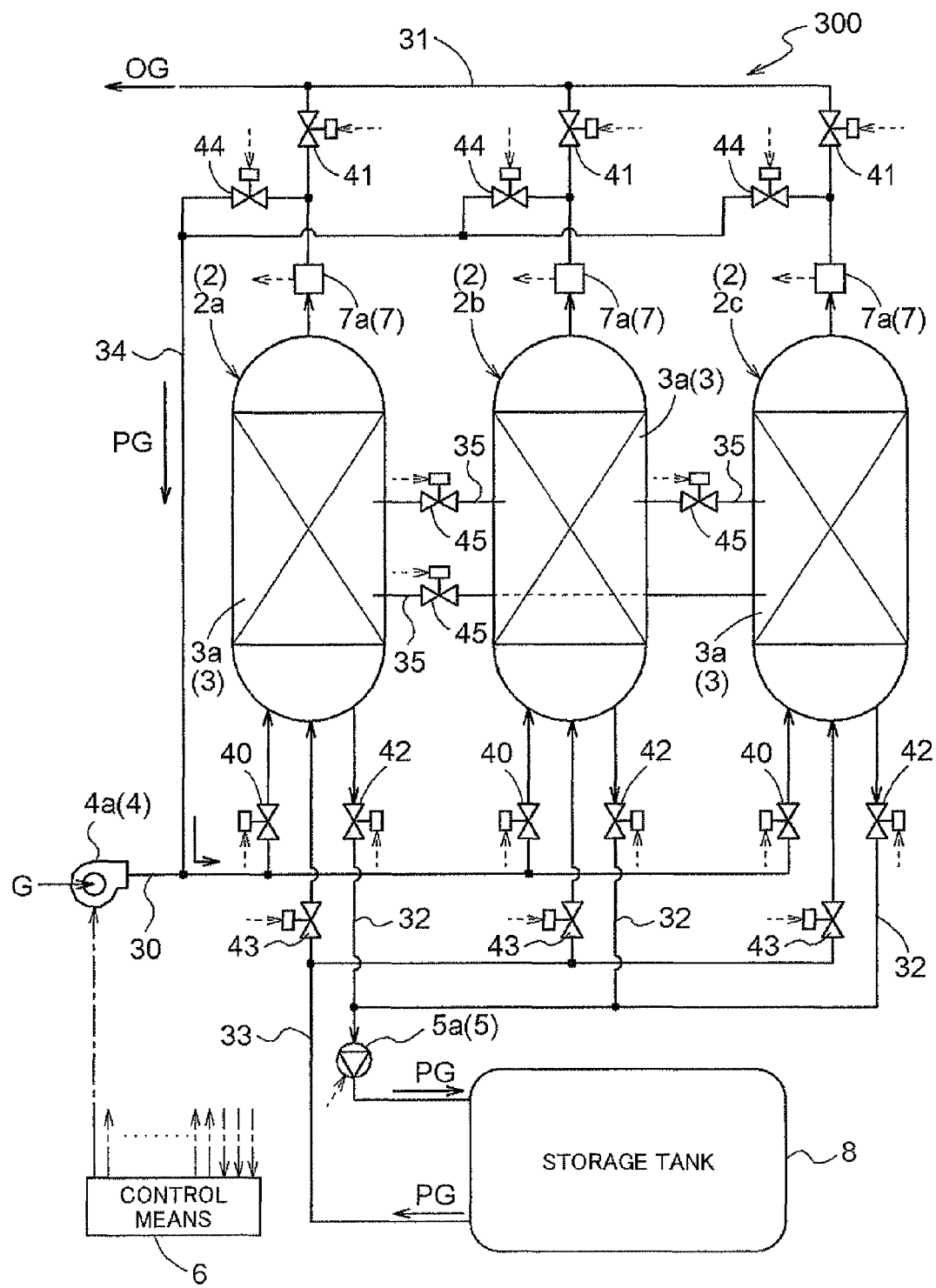
FIG. 10 is a schematic structural diagram showing the structure of the flammable gas concentration device according to Embodiment 3.

The present device 300 shown in FIG. 10 is configured so as to have a combination of a plurality of adsorption towers 2 in addition to the configuration of the present device 200. In order to simplify the description, a case in which there are three adsorption towers 2 will be described, and the adsorption towers 2 will be referred to as the adsorption towers 2a, 2b, 2c.

As shown in FIG. 10, an adsorption tower interconnection path 35 is provided between each of the three towers that include the adsorption tower 2a, the adsorption tower 2b, and the adsorption tower 2c; and an adsorption tower interconnection path switch valve 45 is provided to each adsorption tower interconnection path 35.

Figure 11:
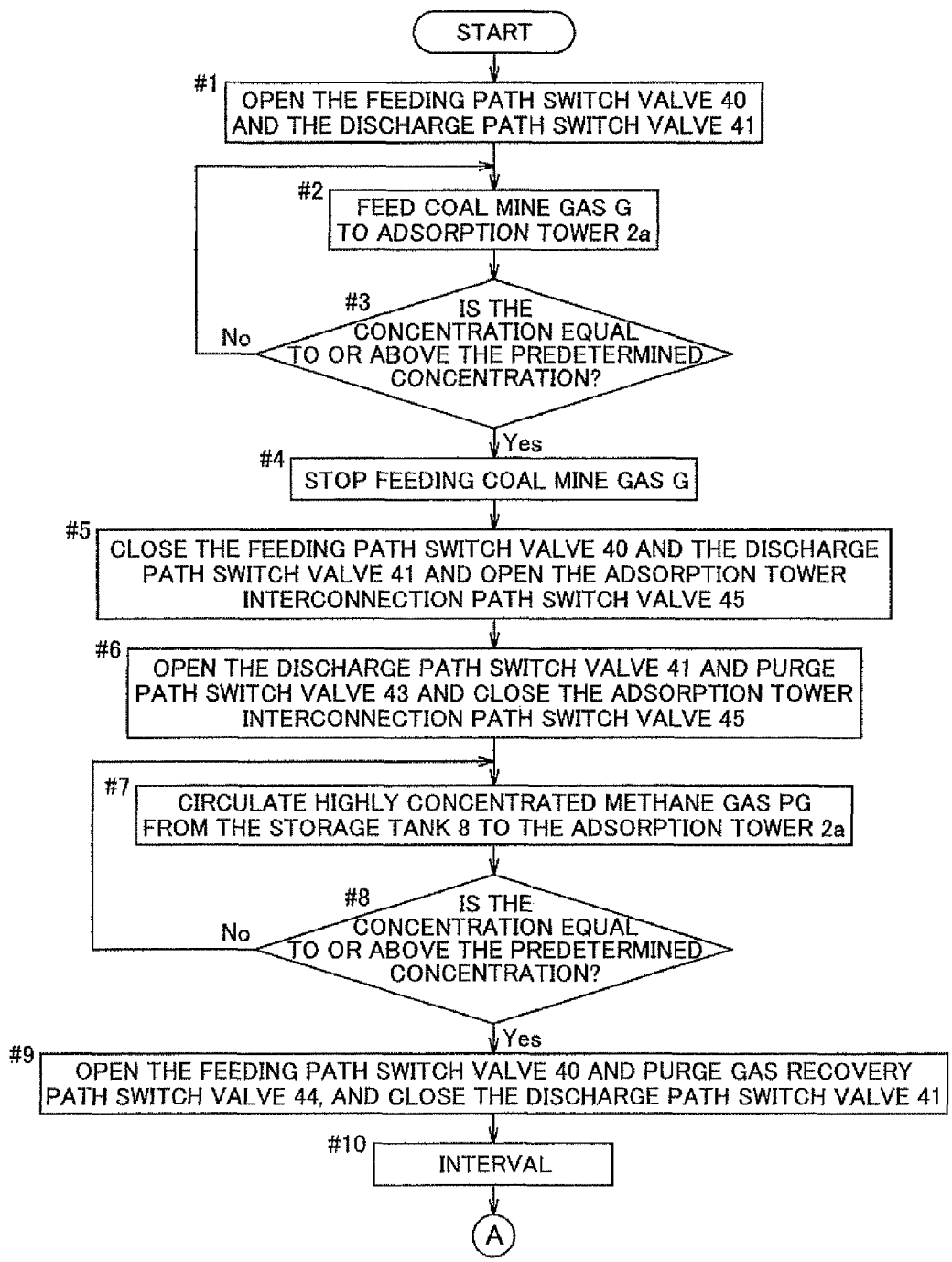
FIG. 11 is a flow diagram showing the operation of the flammable gas concentration device according to Embodiment 3.
Figure 12:
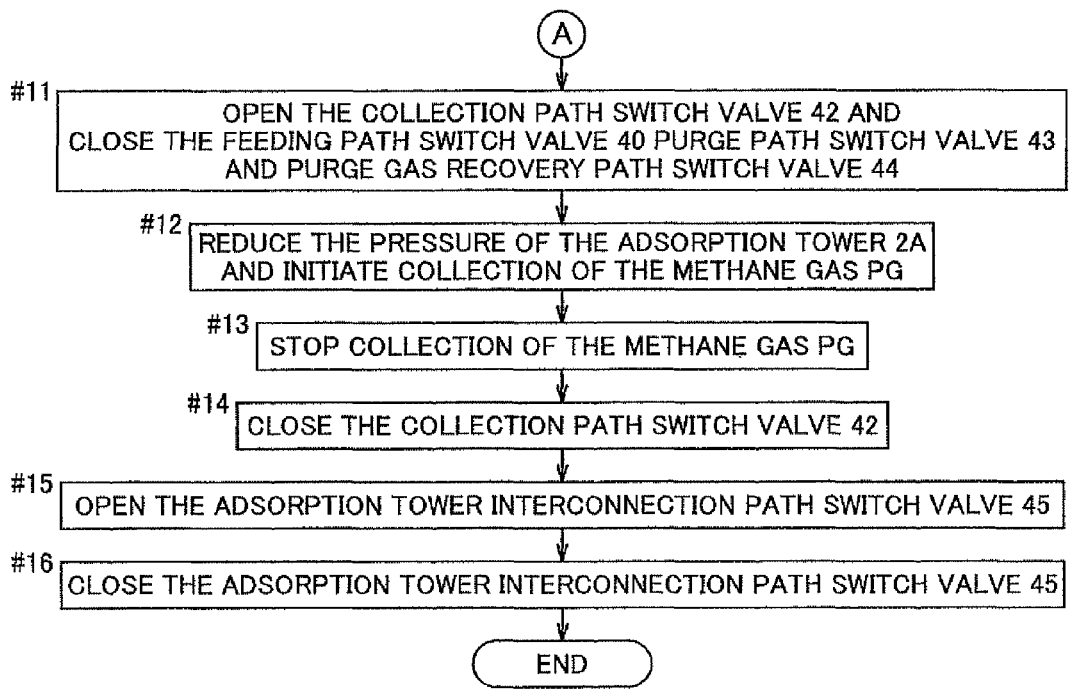
FIG. 12 is a flow diagram showing the operation of the flammable gas concentration device according to Embodiment 3.

The operation whereby methane gas is concentrated by the present device 300 will next be specifically described using FIGS. 11 and 12.

In summary, all of the adsorption towers 2a, 2b, 2c execute the steps concurrently in the sequence A through F, as shown in Table 3 below. Specifically, in the present device 300, the adsorption tower 2a operates in the sequence A: methane gas adsorption step, B: pressure equalization step, C: purge step (including the recirculation step), D: interval, E: methane gas desorption step, F: pressure equalization step; the adsorption tower 2b correspondingly operates in the sequence A: purge step (including the recirculation step), B: interval, C: methane gas desorption step, D: pressure equalization step, E: methane gas adsorption step, F: pressure equalization step; and the adsorption tower 2c operates in the sequence A: methane gas desorption step, B: pressure equalization step, C: methane gas adsorption step, D: pressure equalization step, E: purge step (including the recirculation step), F: interval.

In Table 3, the recirculation step is included in the purge step, and no entry for the recirculation step appears.

TABLE 3

|  | A | B | C |
|---|---|---|---|
| Adsorption tower 2a | methane gas adsorption step | pressure equalization step | purge step |
| Adsorption tower 2b | purge step | interval | methane gas desorption step |
| Adsorption tower 2c | methane gas desorption step | pressure equalization step | methane gas adsorption step |

|  | D | E | F |
|---|---|---|---|
| Adsorption tower 2a | interval | methane gas desorption step | pressure equalization step |
| Adsorption tower 2b | pressure equalization step | methane gas adsorption step | pressure equalization step |
| Adsorption tower 2c | pressure equalization step | purge step | interval |

The adsorption tower 2a will primarily be described, based on FIGS. 11 and 12 and assuming the operations shown in Table 3. First, the feeding path switch valve 40 and discharge path switch valve 41 are opened (step 1) from a state in which the feeding path switch valve 40, the discharge path switch valve 41, the collection path switch valve 42, the purge path switch valve 43, the purge gas recovery path switch valve 44, and the adsorption tower interconnection path switch valve 45 of the adsorption tower 2a have been closed in advance.

The coal mine gas G is fed through the feeding path 30 into the adsorption tower 2a by the ventilator 4a, the methane gas is adsorbed to the methane adsorbent 3a, and the exhaust gas OG not adsorbed to the methane adsorbent 3a from the coal mine gas G fed into the adsorption tower 2a is discharged into the space outside the adsorption towers 2 through the discharge path 31 (step 2). These steps 1 and 2 are the methane gas adsorption step.

The coal mine gas G is thereby fed into the adsorption tower 2a at atmospheric pressure, and it is possible to prevent the valuable methane gas from flowing out into the exhaust gas OG while causing the methane gas to be selectively adsorbed to the methane adsorbent 3a. Specifically, as shown in FIG. 4, until a predetermined time has elapsed, the methane gas is almost completely adsorbed, there is no flow to the outside of the adsorption towers 2, and the methane concentration in the exhaust gas OG is extremely low. The concentration is therefore outside the explosive range.

The methane concentration detection means 7a then detects whether the methane concentration in the exhaust gas OG discharged to the discharge path 31 is equal to or above a predetermined concentration (step 3). When the detected methane concentration is not equal to or above the predetermined concentration, the process returns to step 2, and feeding of the coal mine gas G is continued. When the detected methane concentration is equal to or above the predetermined concentration, feeding of the coal mine gas G to the adsorption tower 2a is stopped (step 4).

The time of completion of methane gas adsorption to the methane adsorbent 3a can thereby be known, discharge of the coal mine gas G that includes methane gas from inside the adsorption tower 2a to the outside can be prevented as much as possible, and a transition to the subsequently performed purge step, recirculation step, methane gas desorption step, and pressure equalization step can be appropriately performed.

Specifically, as shown in FIG. 4, during the time elapsed while the methane gas adsorption step is executed, the methane concentration in the exhaust gas OG is kept extremely low until the predetermined time has elapsed, but when the methane adsorbent 3a reaches the methane adsorption limit (breakthrough), the methane concentration abruptly increases. This phenomenon can be utilized to determine whether the methane adsorbent 3a inside the adsorption tower 2a has reached the adsorption limit.

The feeding path switch valve 40 and the discharge path switch valve 41 are then closed, and the adsorption tower interconnection path switch valve 45 provided between the adsorption tower 2a and the adsorption tower 2c is opened (step 5). This step 5 is the pressure equalization step.

The adsorption tower 2a in which the methane gas adsorption step is competed and the pressure is near atmospheric pressure, and the adsorption tower 2c in which the methane gas desorption step is completed and the pressure is near vacuum are thereby communicated, the gas inside the adsorption tower 2a is circulated into the adsorption tower 2c, the pressure inside the adsorption tower 2c is increased, and an environment can be created in which methane gas can be suitably adsorbed in the subsequently executed methane gas adsorption step. Through the pressure equalization step, the pressure of the adsorption tower 2a is reduced, and the more dilute methane gas that is in a high-pressure state is sent into the adsorption tower 2c, whereby the methane concentration of the product gas obtained from the adsorption tower 2a increases.

The discharge path switch valve 41 and the purge path switch valve 43 are opened, the adsorption tower interconnection path switch valve 45 is closed (step 6), and the highly concentrated methane gas PG for which concentration has been performed is flowed from the storage tank 8 into the adsorption tower 2a through the purge path 33 (step 7). These steps 6 and 7 are the purge step.

The gas (exhaust gas OG: primarily composed of nitrogen gas and oxygen gas) inside the adsorption tower 2a in which almost no methane gas is present is thereby driven out to the discharge path 31, the methane concentration in the adsorption tower 2a is increased, and the concentration of the subsequently collected post-concentration methane gas PG can be prevented from decreasing. Specifically, purification of highly concentrated methane gas PG is made possible by driving out the nitrogen gas, oxygen gas, and the like present in the adsorption tower 2a, and particularly the gases remaining in the gaps of the methane adsorbent 3a.

After nearly all of the exhaust gas OG has been driven out, the post-concentration methane gas PG that flowed into the adsorption tower 2a is discharged to the discharge path 31, and a detection is made as to whether the methane concentration in the discharge path 31 has increased to or above a predetermined concentration (step 8). When the concentration is not equal to or above the predetermined concentration, the process returns to step 7, and flow of the post-concentration methane gas PG into the adsorption tower 2a is continued. When the methane concentration in the discharge path 31 is equal to or above the predetermined concentration, the feeding path switch valve 40 and the purge gas recovery path switch valve 44 are opened, the discharge path switch valve 41 is closed, and the recovered high-concentration methane gas PG and the coal mine gas G are mixed and sent to the adsorption tower 2c in which the methane gas adsorption step is being performed (step 9). This step 9 is the recirculation step. A configuration may also be adopted in which the discharge path switch valve 41 is not opened, and from the start of the process, the high-concentration methane gas PG recovered via the purge gas recovery path 34 and the coal mine gas G are mixed and sent to the adsorption tower 2c in which the methane gas adsorption step is being performed.

The post-concentration methane gas PG is thereby prevented from discharging into the space outside the adsorption tower 2a from the discharge path 31, the post-concentration methane gas PG can be made to flow in to the adsorption tower 2c from the feeding path 30, and the post-concentration methane gas PG can be effectively utilized.

The process proceeds to the methane gas desorption step (step 10) after an interval. A pressure equalization step is performed between the adsorption tower 2b and the adsorption tower 2c at this time.

The collection path switch valve 42 is then opened, and the feeding path switch valve 40, the purge path switch valve 43, and the purge gas recovery path switch valve 44 are closed (step 11). The pressure inside the adsorption tower 2a is then reduced lower than atmospheric pressure, collection of the post-concentration methane gas PG through the collection path 32 is initiated (step 12) while the adsorbed methane gas is desorbed from the methane adsorbent 3a, and the methane gas is stored in the storage tank 8. When the pressure inside the adsorption tower 2a has been reduced to a predetermined pressure, collection of the post-concentration methane gas PG is stopped (step 13), and the collection path switch valve 42 is closed (step 14). These steps 11 through 14 are the methane gas desorption step.

The methane gas is thereby adsorbed to the methane adsorbent 3a, and it is possible to concentrate the methane gas to a high concentration while reducing the methane concentration in the exhaust gas OG, and to prevent the concentration of the exhaust gas OG and the post-concentration methane gas PG from entering the explosive range.

Specifically, as shown in FIG. 5, from the start of the methane gas desorption step until completion of the methane gas desorption step, the methane concentration in the post-concentration methane gas PG increases as time elapses. In the same manner, the pressure inside the adsorption tower 2a gradually decreases from atmospheric pressure to a near vacuum as time elapses, and the methane concentration in the post-concentration methane gas PG accordingly increases, as shown in FIG. 6. In other words, it is apparent that when the pressure is reduced in the methane gas desorption step, a certain amount of time elapses, and the inside of the adsorption tower 2a approaches a vacuum, the methane concentration of the collected post-concentration methane gas PG accordingly increases. Consequently, a state occurs in which the methane concentration in the post-concentration methane gas PG is extremely high, and the concentration can be prevented from entering the explosive range. The methane concentration is kept low in the exhaust gas OG as well in the manner described above, and the concentration can be prevented from entering the explosive range.

Furthermore, by performing the purge step or the recirculation step in the example described above, the methane gas PG as the product gas can be concentrated to a high concentration in which the average methane concentration is approximately 50 to 99 vol %, and the average oxygen concentration is approximately 0.2 to 10 vol %, and the concentration can be always prevented from entering the explosive range.

The adsorption tower interconnection path switch valve 45 provided between the adsorption tower 2a and the adsorption tower 2b is then opened (step 15). This step 15 is also a pressure equalization step. When the pressure is then equalized between the adsorption tower 2a and the adsorption tower 2b, the adsorption tower interconnection path switch valve 45 is closed (step 16).

The adsorption tower 2a in which the methane gas desorption step is competed and the pressure is near vacuum, and the adsorption tower 2b in which the methane gas adsorption step is completed and the pressure is near atmospheric pressure are thereby communicated, the gas inside the adsorption tower 2b is circulated into the adsorption tower 2a, the pressure inside the adsorption tower 2a is increased, and an environment can be created in which methane gas can be suitably adsorbed in the subsequently executed methane gas adsorption step. Through the pressure equalization step, the pressure of the adsorption tower 2b is reduced, and the more dilute methane gas that is in a high-pressure state is sent into the adsorption tower 2a, whereby the methane concentration of the product gas obtained from the adsorption tower 2b increases.

In the embodiments described above, methane gas can be efficiently adsorbed from the coal mine gas G to the methane adsorbent 3a at atmospheric pressure, the post-concentration methane gas PG as the product gas can be safely purified to a higher concentration, and the concentration of the exhaust gas OG can be prevented from entering the explosive range.

Furthermore, in the three adsorption towers 2, the pressure equalization step is performed, adsorption of methane gas is accelerated, concentration of methane gas can be performed continuously, and the ability to produce highly concentrated methane gas PG is enhanced.

[Embodiment 4]

Figure 13:
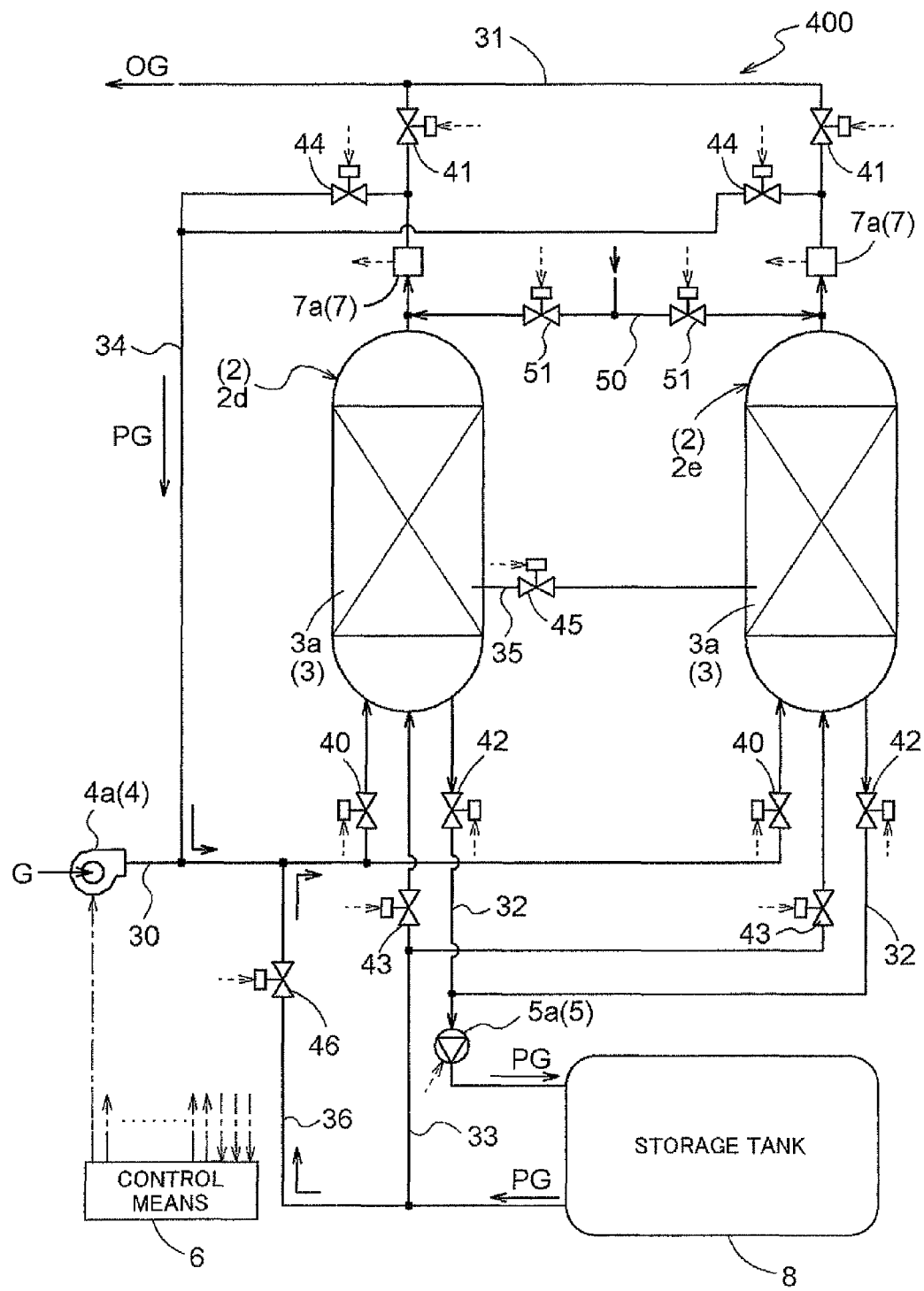
FIG. 13 is a schematic structural diagram showing the structure of the flammable gas concentration device according to Embodiments 4 through 6.

A case in which a single adsorption tower 2 was used, and a case in which a plurality (three) of towers was used were described in Embodiments 1 through 3 above, but a case in which the present device 400 uses two adsorption towers 2 (an adsorption tower 2d and an adsorption tower 2e) will be described hereinafter based on FIG. 13. In the present device 400 in this case, the first adsorption tower 2d operates in the sequence A: methane gas adsorption step, B: pressure equalization step, C: methane gas desorption step, D: pressure equalization step; and the second adsorption tower 2e correspondingly operates in the sequence A: methane gas desorption step, B: pressure equalization step, C: methane gas adsorption step, D: pressure equalization step, as shown in Table 4. Concentration of methane gas can be performed continuously, and it is possible to equalize pressure between the towers and enhance efficiency when the methane gas adsorption step is performed.

TABLE 4

| | A | B | C | D |
|---|---|---|---|---|
| Adsorption tower 2d | methane gas adsorption step | pressure equalization step | methane gas desorption step | pressure equalization step |
| Adsorption tower 2e | methane gas desorption step | pressure equalization step | methane gas adsorption step | pressure equalization step |

Specifically, unless otherwise indicated, two adsorption towers 2 filled by the methane adsorbent 3a described in Example 7 above were used under the same conditions as in Example 1 of Embodiment 1, the adsorption, pressure equalization, desorption, and pressure equalization steps for the methane gas were performed as shown in Table 4, and the methane gas in the coal mine gas G was concentrated. The adsorption towers 2d, 2e were each cylindrical adsorption towers 2 having a volume of 0.333 L and filled with 206.7 g of the methane adsorbent 3a.

Specifically, primarily describing the adsorption tower 2d (the opening and closing of the feeding path switch valve 40 and other switch valves are the same as in the embodiments described above, and therefore will not be described), the coal mine gas G is fed through the feeding path 30 into the adsorption tower 2d by the ventilator 4a in a state in which the gas is evacuated in advance, the methane gas is adsorbed to the methane adsorbent 3a, and the exhaust gas OG not adsorbed to the methane adsorbent 3a from the coal mine gas G fed into the adsorption tower 2d is discharged into the space outside the adsorption towers 2 through the discharge path 31 (part of the methane gas adsorption step). The methane concentration detection means 7a detects completion of adsorption of the methane gas to the methane adsorbent 3a, after which the adsorption tower 2d in which the methane gas adsorption step is completed and the pressure is near atmospheric pressure, and the adsorption tower 2e in which the methane gas desorption step is completed and the pressure is near a vacuum are communicated by the adsorption tower interconnection path 35, and the gas inside the adsorption tower 2d is circulated into the adsorption tower 2e (part of the pressure equalization step). The pressure is thereby reduced inside the adsorption tower 2d, and a relatively high-concentration product gas (post-concentration methane gas PG) can be obtained in the subsequently performed methane gas desorption step. The pressure in the adsorption tower 2e is also increased, and it becomes possible for the methane gas to easily be adsorbed in the subsequently performed methane gas adsorption step. The pressure in the adsorption tower 2d is then further reduced, and collection of the post-concentration methane gas PG through the collection path is initiated while the adsorbed methane gas is desorbed from the methane adsorbent 3a, and the methane gas is stored in the storage tank 8 (part of the methane gas desorption step). The adsorption tower 2d in which the methane gas desorption step is completed and the pressure is near a vacuum, and the adsorption tower 2e in which the methane gas adsorption step is completed and the pressure is near atmospheric pressure are then communicated by the adsorption tower interconnection path 35, and the gas inside the adsorption tower 2e is circulated into the adsorption tower 2d (part of the pressure equalization step). The pressure is thereby reduced inside the adsorption tower 2e, and a relatively high-concentration product gas (post-concentration methane gas PG) can be obtained in the subsequently performed methane gas desorption step. The pressure in the adsorption tower 2d is also increased, and it becomes possible for the methane gas to easily be adsorbed in the subsequently performed methane gas adsorption step. In the present embodiment, the air pressure-increase step described hereinafter is not performed.

The methane concentration of the post-concentration methane gas PG obtained in the adsorption tower 2d in this manner was 52.7 vol %, and the oxygen concentration was 9 vol %. Consequently, it is clearly apparent that the methane concentration in the post-concentration methane gas PG is enhanced when the pressure equalization step is performed as in the present embodiment, in comparison to Example 7 (in which the pressure equalization step was not performed) in which the methane concentration of the post-concentration methane gas PG was 40.2 vol %, and the oxygen concentration was 11.4 vol %. By thus performing the pressure equalization step, the efficiency of concentrating the methane gas can be enhanced, and the concentration can be prevented from entering the explosive range.

[Embodiment 5]

In Embodiment 4 described above, the present device 400 using two adsorption towers 2 was configured so as to perform the methane gas adsorption step, the pressure equalization step, the methane gas desorption step, and the pressure equalization step; but the present device 400 may also be configured so as to perform an air pressure-increase step of introducing air near atmospheric pressure into the adsorption tower 2 and increasing the pressure thereof, prior to the methane gas adsorption step. This present device 400 will be described based on FIG. 13.

In this case, the first adsorption tower 2d of the present device 400 operates in the sequence A: methane gas adsorption step, B: pressure equalization step, C: methane gas desorption step, D: methane gas desorption step, E: pressure equalization step, F: air pressure-increase step; and the second adsorption tower 2e correspondingly operates in the sequence A: methane gas desorption step, B: pressure equalization step, C: air pressure-increase step, D: methane gas adsorption step, E: pressure equalization step, F: methane gas desorption step, as shown in Table 5, and concentration of methane gas can be performed continuously. In this instance, the pressure of both towers can be equalized to enhance the efficiency during the methane gas adsorption step or the methane gas desorption step, and the pressure can be increased to near atmospheric pressure prior to the methane gas adsorption step to enhance efficiency when the methane gas adsorption step is performed.

TABLE 5

|  | A | B | C |
| --- | --- | --- | --- |
| Adsorption tower 2d | methane gas adsorption step | pressure equalization step | methane gas desorption step |
| Adsorption tower 2e | methane gas desorption step | pressure equalization step | air pressure-increase step |

|  | D | E | F |
| --- | --- | --- | --- |
| Adsorption tower 2d | methane gas desorption step | pressure equalization step | air pressure-increase step |
| Adsorption tower 2e | methane gas adsorption step | pressure equalization step | methane gas desorption step |

Specifically, unless otherwise indicated, two adsorption towers 2 (adsorption tower 2d, adsorption tower 2e) filled by the methane adsorbent 3a described in Example 7 above were used under the same conditions as in Embodiment 4, the adsorption, pressure equalization, desorption, pressure equalization, and air pressure-increase steps for the methane gas were performed as shown in Table 5, and the methane gas in the coal mine gas G was concentrated. The adsorption towers 2d, 2e were each cylindrical adsorption towers 2 having a volume of 0.5 L and filled with 245.5 g of the methane adsorbent 3a, and the coal mine gas G was fed to the adsorption towers 2 at 2 L/M.

Specifically, primarily describing the adsorption tower 2d (the opening and closing of the feeding path switch valve 40 and other switch valves are the same as in the embodiments described above, and therefore will not be described), the coal mine gas G is fed through the feeding path 30 into the adsorption tower 2d by the ventilator 4a in a state in which the gas is evacuated in advance, the methane gas is adsorbed to the methane adsorbent 3a, and the exhaust gas OG not adsorbed to the methane adsorbent 3a from the coal mine gas G fed into the adsorption tower 2d is discharged into the space outside the adsorption towers 2 through the discharge path 31 (part of the methane gas adsorption step).

When the methane concentration of the exhaust gas OG detected by the methane concentration detection means 7a reaches 3.7 vol %, a determination is made that adsorption of the methane gas to the methane adsorbent 3a is completed, after which the adsorption tower 2d in which the methane gas adsorption step is completed and the pressure is near atmospheric pressure, and the adsorption tower 2e in which the methane gas desorption step is completed and the pressure is near a vacuum are communicated by the adsorption tower interconnection path 35, and the gas inside the adsorption tower 2d is circulated into the adsorption tower 2e (part of the pressure equalization step). The pressure is thereby reduced inside the adsorption tower 2d, and a relatively high-concentration product gas (post-concentration methane gas PG) can be obtained in the subsequently performed methane gas desorption step. The pressure in the adsorption tower 2e is also increased, and it becomes possible for the methane gas to easily be adsorbed in the subsequently performed methane gas adsorption step.

The pressure in the adsorption tower 2d is then further reduced, collection of the post-concentration methane gas PG through the collection path is initiated while the adsorbed methane gas is desorbed from the methane adsorbent 3a, and the methane gas is stored in the storage tank 8 (part of the methane gas desorption step). The air pressure-increase step (described hereinafter) and the methane gas adsorption step are executed in the adsorption tower 2e at this time.

The adsorption tower 2d in which the methane gas desorption step is completed and the pressure is near a vacuum, and the adsorption tower 2e in which the methane gas adsorption step is completed and the pressure is near atmospheric pressure are then communicated by the adsorption tower interconnection path 35, and the gas inside the adsorption tower 2e is circulated into the adsorption tower 2d (part of the pressure equalization step). In this pressure equalization step, the pressures inside the adsorption tower 2d and the adsorption tower 2e are generally equalized to a pressure between a vacuum and atmospheric pressure.

In the adsorption tower 2d in which the methane gas adsorption step is performed after the pressure equalization step, air near atmospheric pressure is introduced from an introduction path 50 so that methane gas can be more easily adsorbed, and the pressure inside the adsorption tower 2d is increased to near atmospheric pressure (part of the air pressure-increase step). The introduction path 50 communicates the outside space and the adsorption tower 2d (on the side of the discharge path 31), or the outside space and the adsorption tower 2e (on the side of the discharge path 31) via respective introduction path switch valves 51, and by opening and closing the introduction path switch valve 51, air at about atmospheric pressure can be fed through the introduction path 50 from the outside space to the adsorption tower 2d or adsorption tower 2e. After this air pressure-increase step, the methane gas adsorption step is performed in the adsorption tower 2d. The post-concentration methane gas PG is collected in the same manner in corresponding fashion in the adsorption tower 2e as well.

Figure 14:
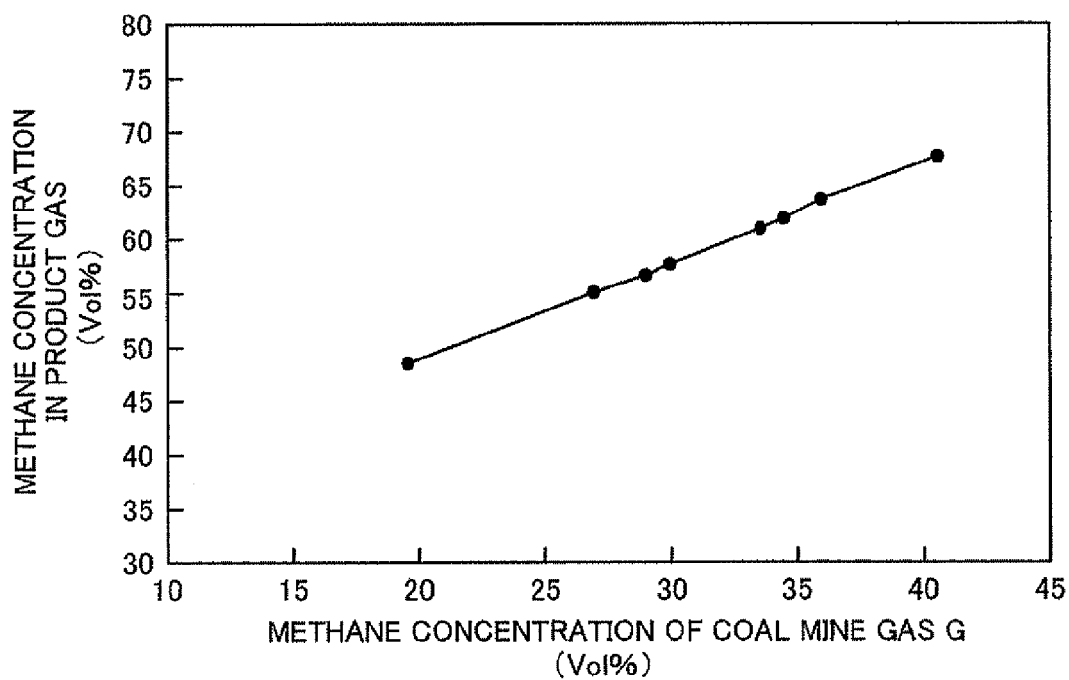
FIG. 14 is a graph showing the relationship between the methane concentration of the coal mine gas G and the methane concentration of the post-concentration methane gas PG in Embodiment 5.

It was fully confirmed that the post-concentration methane gas PG obtained through the use of the adsorption towers 2d, 2e can be continuously manufactured in accordance with the concentration of the fed coal mine gas G, as shown in FIG. 14. Furthermore, it was confirmed that by managing the methane concentration of the exhaust gas OG in the discharge path 31 through the use of the methane concentration detection means 7a so as to obtain a predetermined methane concentration (about 3.7 vol %, for example), the methane concentration of the obtained post-concentration methane gas PG is in the range of about 45 to 55 vol % even when the methane concentration in the coal mine gas G varies (e.g., even when the methane concentration in the coal mine gas G is in the range of 20 to 30 vol %, which is a methane concentration near the explosive range), as shown in FIG. 14. Therefore, the coal mine gas G, the exhaust gas OG, and the post-concentration methane gas PG are all outside the explosive range, and processing of the coal mine gas G and the exhaust gas OG, and it was confirmed that concentration of the methane gas PG can be stably and safely performed.

[Embodiment 6]

In Embodiment 5 described above, the present device 400 using two adsorption towers 2 was configured so as to perform the methane gas adsorption step, the pressure equalization step, the methane gas desorption step, the pressure equalization step, and the air pressure-increase step, but the present device 400 may also be configured so as to perform an air pressure-increase step of introducing air near atmospheric pressure into the adsorption tower 2 and increasing the pressure thereof to a predetermined pressure prior to the methane gas adsorption step, and then furthermore performing the methane gas adsorption step after feeding the collected high-concentration flammable gas. This present device 400 will be described based on FIG. 13.

In this case, the first adsorption tower 2d of the present device 400 operates in the sequence A: methane gas adsorption step, B: pressure equalization step, C: methane gas desorption step, D: methane gas desorption step, E: methane gas desorption step, F: pressure equalization step, G: air pressure-increase step, H: product gas pressure-increase step; and the second adsorption tower 2e correspondingly operates in the sequence A: methane gas desorption step, B: pressure equalization step, C: air pressure-increase step, D: product gas pressure-increase step, E: methane gas adsorption step, F: pressure equalization step, G: methane gas desorption step, H: methane gas desorption step, as shown in Table 6; and concentration of methane gas can be performed continuously. In this instance, the pressure of both towers can be equalized to enhance the efficiency during the methane gas adsorption step or the methane gas desorption step. The efficiency can be enhanced when the methane gas adsorption step is performed particularly by increasing the pressure to near atmospheric pressure through the use of air and high-concentration methane gas PG (product gas) prior to the methane gas adsorption step. Since the highly concentrated methane gas PG is also fed in the methane gas adsorption step, the concentration efficiency can be enhanced.

TABLE 6

| | A | B | C |
|---|---|---|---|
| Adsorption tower 2d | methane gas adsorption step | pressure equalization step | methane gas desorption step |
| Adsorption tower 2e | methane gas desorption step | pressure equalization step | air pressure-increase step |

| | D | E | F |
|---|---|---|---|
| Adsorption tower 2d | methane gas desorption step | methane gas desorption step | pressure equalization step |
| Adsorption tower 2e | product gas pressure-increase step | methane gas adsorption step | pressure equalization step |

| | G | H |
|---|---|---|
| Adsorption tower 2d | air pressure-increase step | product gas pressure-increase step |
| Adsorption tower 2e | methane gas desorption step | methane gas desorption step |

Specifically, unless otherwise indicated, two adsorption towers 2 (adsorption tower 2d, adsorption tower 2e) filled by the methane adsorbent 3a described in Example 7 above were used under the same conditions as in Embodiment 5, the adsorption, pressure equalization, desorption, pressure equalization, air pressure-increase, and product gas pressure-increase steps for the methane gas were performed as shown in Table 6, and the methane gas in the coal mine gas G was concentrated The adsorption towers 2d, 2e were each cylindrical adsorption towers 2 having a volume of 0.5 L and filled with 245.5 g of the methane adsorbent 3a, and the coal mine gas G was fed to the adsorption towers 2 at 2 L/M.

Specifically, primarily describing the adsorption tower 2d (the opening and closing of the feeding path switch valve 40 and other switch valves are the same as in the embodiments described above, and therefore will not be described), the coal mine gas G is fed through the feeding path 30 into the adsorption tower 2d by the ventilator 4a in a state in which the gas is evacuated in advance, the methane gas is adsorbed to the methane adsorbent 3a, and the exhaust gas OG not adsorbed to the methane adsorbent 3a from the coal mine gas G fed into the adsorption tower 2d is discharged into the space outside the adsorption towers 2 through the discharge path 31 (part of the methane gas adsorption step).

When the methane concentration of the exhaust gas OG detected by the methane concentration detection means 7a reaches 3.7 vol %, a determination is made that adsorption of the methane gas to the methane adsorbent 3a is completed, after which the adsorption tower 2d in which the methane gas adsorption step is completed and the pressure is near atmospheric pressure, and the adsorption tower 2e in which the methane gas desorption step is completed and the pressure is near a vacuum are communicated by the adsorption tower interconnection path 35, and the gas inside the adsorption tower 2d is circulated into the adsorption tower 2e (part of the pressure equalization step). The pressure is thereby reduced inside the adsorption tower 2d, and a relatively high-concentration product gas (post-concentration methane gas PS) can be obtained in the subsequently performed methane gas desorption step. The pressure in the adsorption tower 2e is also increased, and it becomes possible for the methane gas to easily be adsorbed in the subsequently performed methane gas adsorption step.

The pressure in the adsorption tower 2d is then further reduced, collection of the post-concentration methane gas PG through the collection path 32 is initiated while the adsorbed methane gas is desorbed from the methane adsorbent 3a, and the methane gas is stored in the storage tank 8 (part of the methane gas desorption step). The air pressure-increase step described hereinafter, and the product gas pressure-increase step and methane gas adsorption step are executed in the adsorption tower 2e at this time.

The adsorption tower 2d in which the methane gas desorption step is completed and the pressure is near a vacuum, and the adsorption tower 2e in which the methane gas adsorption step is completed and the pressure is near atmospheric pressure are then communicated by the adsorption tower interconnection path 35, and the gas inside the adsorption tower 2e is circulated into the adsorption tower 2d (part of the pressure equalization step). In this pressure equalization step, the pressures inside the adsorption tower 2d and the adsorption tower 2e are generally equalized to a pressure between a vacuum and atmospheric pressure.

In the adsorption tower 2d in which the methane gas adsorption step is performed after the pressure equalization step, air near atmospheric pressure is introduced from the introduction path 50 so that methane gas can be more easily adsorbed, the pressure inside the adsorption tower 2d is increased to a predetermined pressure (part of the air pressure-increase step), and the post-concentration methane gas PG in the storage tank 8 is introduced through the purge path 33 to increase the pressure inside the adsorption tower 2d from the predetermined pressure to near atmospheric pressure (product gas pressure-increase step). The air pressure-increase step in the present embodiment is performed only for half the time during which only air in the air pressure-increase step of Embodiment 5 is introduced to increase the pressure to atmospheric pressure all at once, and during the remaining time, the product gas pressure-increase step is performed by introducing 0.3 L of the methane gas PG until atmospheric pressure is reached. After the air pressure-increase step and the product gas pressure-increase step, the methane gas adsorption step is performed in the adsorption tower 2d. The post-concentration methane gas PG is collected in the same manner in corresponding fashion in the adsorption tower 2e as well.

The methane concentration of the post-concentration methane gas PG obtained by the adsorption tower 2d in this manner was 51.5 vol %, and it is apparent that the methane concentration was enhanced relative to the methane concentration (40.2 vol %) in Example 7 of Embodiment 1.

In Embodiment 6, the product gas pressure-increase step was performed by introducing 0.5 L of the methane gas PG until atmospheric pressure was reached. As a result, the methane concentration of the post-concentration methane gas PG obtained by the adsorption tower 2d was enhanced to 53.5 vol %.

Also in Embodiment 6, the product gas pressure-increase step was performed by introducing 1.0 L of the methane gas PG until atmospheric pressure was reached. As a result, the methane concentration of the post-concentration methane gas PG obtained by the adsorption tower 2d was enhanced to 57.0 vol %.

It was also apparent that the concentration of the product gas was outside the explosive concentration range, and that a high-concentration methane gas PG is stably and safely obtained in any of the cases as described above by repeatedly performing the methane gas adsorption step, pressure equalization step, methane gas desorption step, pressure equalization step, air pressure-increase step, product gas pressure-increase step, and methane gas adsorption step in sequence in alternating fashion between the two adsorption towers 2.

It was also confirmed that the methane gas can be concentrated to a high methane concentration such as described above not only when two adsorption towers 2 are used, but also in the same manner when three adsorption towers 2 are used.

[Other Embodiments]

(1) In Embodiments 1 through 6 described above, a dehumidifier may be provided in order to remove moisture from the fed coal mine gas G and enable the flammable gas to be suitably adsorbed to the adsorbent 3. Specifically, moisture in the coal mine gas G can be removed by providing a dehumidifier in the feeding path 30. A moisture adsorbent capable of selectively adsorbing moisture may also be filled into the adsorption tower 2, and the flammable gas adsorption performance can be prevented from decreasing due to moisture.

(2) An adsorbent 3 is filled into the adsorption tower 2 in Embodiments 1 through 6, but the adsorbent 3 may be used independently, and a mixture of two or more types thereof may also used.

(3) In Embodiments 1 through 6, a flammable gas concentration device may be configured in which a re-feeding path 36 for communicating the feeding path 30 and the storage tank 8 that stores the collected flammable gas is provided, and in the flammable gas adsorption step, the control means 6 mixes the raw gas G flowing through the feeding path 30, and a portion of the highly concentrated flammable gas PG flowing through the feeding path 30 from the storage tank 3 via the re-feeding path 36, and feeds the mixed gas to the adsorption tower 2.

Even in such cases as when the concentration of the flammable gas in the raw gas G is low, by opening a re-feeding path switch valve 46 provided to the re-feeding path 36 in the feeding path 30 before the raw gas G is fed to the adsorption tower 2, the raw gas G can be fed into the adsorption tower 2 after being mixed with the highly concentrated flammable gas circulated from the storage tank 8 through the re-feeding path 36, and having the concentration thereof increased by a certain degree.

The concentration of the post-concentration flammable gas PG collected into the storage tank 8 can thereby be even further increased, and the concentration of the raw gas G or the post-concentration flammable gas PG can be effectively prevented from entering the explosive range.

(4) In Embodiments 1 through 6, coal mine gas was used as the raw gas G, and methane gas was used as the flammable gas, but the raw gas G is not particularly limited insofar as air and a flammable gas are included therein, and the flammable gas is not particularly limited insofar as the flammable gas is a gas that is flammable. The physical properties of the adsorbent 3 may be appropriately varied according to the type of flammable gas, and the flammable gas can be selectively adsorbed when an adsorbent 3 is selected in which the average micropore diameter is about 1.2 to 2 times the average molecular diameter of the flammable gas, for example.

(5) A methane concentration detection means 7a was used as the adsorption completion detection means 7 in Embodiments 1 through 6, but an elapsed time measurement means 7b may instead be used.

Specifically, the elapsed time measurement means 7b is capable of measuring in advance the breakthrough time at which the adsorbent 3 filled into the adsorption tower 2 reaches the flammable gas adsorption limit (breakthrough), furthermore measuring the elapsed time after the start of flammable gas adsorption in the flammable gas adsorption step, and transmitting notification to the control means 6 to end the flammable gas adsorption step before the elapsed time reaches the abovementioned breakthrough time. The control means 6 can thereby control the feeding path switch valve 40 and stop feeding of the raw gas G by the feeding means 4.

In this case, the breakthrough time and the elapsed time are compared by the elapsed time measurement means 7b, and when the elapsed time has not exceeded the breakthrough time, feeding of the raw gas G is continued. When the elapsed time is the same as or greater than the breakthrough time, feeding of the raw gas G is stopped, and the raw gas G can be prevented as much as possible from discharging to the outside of the adsorption tower 2, and the transition to the flammable gas desorption step can be suitably made.

(6) Air was fed to the adsorption tower 2 in which the flammable gas desorption step was completed in Embodiments 1, 2, 5, and 6, but this configuration is not limiting, and ventilation methane (ventilation air methane; usually having a methane concentration of 0.5%) may be used that is discharged into the atmosphere by ventilation into the mine during mining in the coal mine, for example. The methane gas included in the ventilation air methane can thereby be recovered, and the ventilation methane that was conventionally discharged can be effectively recovered.

Industrial Applicability

The flammable gas concentration device and flammable gas concentration method according to the present invention can be effectively utilized as a technique for obtaining a high degree of concentration while preventing a concentration in the explosive range when concentrating a flammable gas.

The invention claimed is:

1. A flammable gas concentration device comprising:
    an adsorption tower filled by an adsorbent for adsorbing a flammable gas, wherein said adsorbent is a methane adsorbent for selectively adsorbing methane gas, wherein said adsorbent has a methane gas adsorption of 20 Ncc/g or higher at atmospheric pressure and 298 K, and wherein said adsorbent is at least one of active carbon, zeolite, silica gel and an organic metal complex;
    feeding means for feeding a raw gas containing air and a flammable gas to said adsorption tower at near atmospheric pressure via a feeding path and discharging an exhaust gas in said raw gas which has not been adsorbed to said adsorbent to an outside of said adsorption tower via a discharge path;
    collection means for reducing a pressure in said adsorption tower lower than an atmospheric pressure, and desorbing the flammable gas adsorbed by said adsorbent and collecting the flammable gas through a collection path; and
    control means for sequentially executing a flammable gas adsorption step of feeding said raw gas to said adsorption tower and discharging said exhaust gas from said adsorption tower by said feeding means, and a flammable gas desorption step of collecting said flammable gas desorbed by said collection means.

2. The flammable gas concentration device according to claim 1, wherein said adsorbent has an average micropore diameter of 4.5 to 15 Å as measured by the MP method.

3. The flammable gas concentration device according to claim 1, wherein said adsorbent has a volume of micropores having an average micropore diameter of 10 Å or less as measured by the HK method that is 50 vol % or more of a total micropore volume.

4. The flammable gas concentration device according to claim 1, wherein said adsorbent has a nitrogen adsorption at 77 K such that the nitrogen adsorption at a relative pressure of 0.013 corresponding to an average micropore diameter of 10 Å as measured by the HK method is 50 vol % or more of a nitrogen adsorption at a relative pressure of 0.99 corresponding to the total micropore volume.

5. The flammable gas concentration device according to claim 1, comprising:
    adsorption completion detection means for detecting a state of said flammable gas in said discharge path; wherein
    said control means executes a switch from said flammable gas adsorption step to said flammable gas desorption step on the basis of detection results of said adsorption completion detection means.

6. The flammable gas concentration device according to claim 1, wherein said control means executes said flammable gas adsorption step after feeding air to said adsorption tower in which said flammable gas desorption step has been completed.

7. The flammable gas concentration device according to claim 6, wherein said control means furthermore feeds said collected flammable gas to the adsorption tower after feeding air to said adsorption tower, and then executes said flammable gas adsorption step.

8. The flammable gas concentration device according to claim 1, comprising:
    a purge path for communicating said adsorption tower and a storage tank for storing the collected flammable gas; wherein
    said control means executes a purge step of circulating a portion of the highly concentrated flammable gas in said storage tank through said purge path into said adsorption tower in which said flammable gas adsorption step has been completed, prior to said flammable gas desorption step.

9. The flammable gas concentration device according to claim 8, wherein said control means executes a recirculation step of recirculating the highly concentrated flammable gas to said feeding path through a purge gas recovery path for communicating and connecting said discharge path and said feeding path, prior to said flammable gas desorption step and after said highly concentrated flammable gas circulated to said adsorption tower is discharged to said discharge path from said adsorption tower in said purge step.

10. The flammable gas concentration device according to claim 1, wherein said adsorption tower is composed of two towers, and said control means executes said flammable gas adsorption step and said flammable gas desorption step in alternating fashion between said two adsorption towers.

11. The flammable gas concentration device according to claim 8, wherein said adsorption tower is composed of a plurality of towers, and said control means sequentially executes said flammable gas adsorption step, said purge step, and said flammable gas desorption step among said plurality of adsorption towers.

12. The flammable gas concentration device according to claim 10, wherein said control means executes a pressure equalization step between one adsorption tower in which the flammable gas desorption step is completed and the other adsorption tower in which the flammable gas adsorption step is completed, in which a gas in the other adsorption tower is flowed to the one adsorption tower through an adsorption tower communicating path for communicating therebetween, prior to said flammable gas adsorption step in said one adsorption tower and prior to said flammable gas desorption step in said other adsorption tower.

13. The flammable gas concentration device according to claim 1, comprising:
- a re-feeding path for communicating said feeding path and a storage tank for storing collected flammable gas; wherein
- said control means in said flammable gas adsorption step mixes and feeds to said adsorption tower the raw gas flowing through said feeding path and a portion of the highly concentrated flammable gas flowing through said feeding path from said storage tank through the re-feeding path.

14. A flammable gas concentration method comprising:
- executing a flammable gas adsorption step of feeding a raw gas containing air and a flammable gas at near atmospheric pressure through a feeding path to an adsorption tower filled by an adsorbent for adsorbing the flammable gas, and discharging an exhaust gas in said raw gas which has not been adsorbed by said adsorbent to an outside of said adsorption tower via a discharge path; and
- subsequently executing a flammable gas desorption step of reducing a pressure in said adsorption tower lower than an atmospheric pressure, desorbing the flammable gas adsorbed by said adsorbent, and collecting said flammable gas through a collection path,
- wherein said adsorbent is a methane adsorbent for selectively adsorbing methane gas, wherein said adsorbent has a methane gas adsorption of 20 Ncc/g or higher at atmospheric pressure and 298 K, and wherein said adsorbent is at least one of active carbon, zeolite, silica gel and an organic metal complex.

15. The flammable gas concentration method according to claim 14, comprising executing a purge step of circulating a portion of highly concentrated flammable gas that is in a storage tank for storing the collected flammable gas through a purge path into said adsorption tower in which said flammable gas adsorption step has been completed, prior to executing said flammable gas desorption step.

16. The flammable gas concentration method according to claim 15, comprising executing a recirculation step of recirculating the flammable gas to said feeding path through a purge gas recovery path prior to executing said flammable gas desorption step and after said flammable gas circulated to said adsorption tower is discharged to said discharge path from said adsorption tower in said purge step.

17. The flammable gas concentration device according to claim 11, wherein said control means executes a pressure equalization step between one adsorption tower of the plurality of towers in which the flammable gas desorption step is completed and another adsorption tower of the plurality of towers in which the flammable gas adsorption step is completed, in which a gas in another adsorption tower is flowed to the one adsorption tower through an adsorption tower communicating path for communicating therebetween, prior to said flammable gas adsorption step in said one adsorption tower and prior to said flammable gas desorption step in said another adsorption tower.

* * * * *